(12) United States Patent
Xu et al.

(10) Patent No.: US 9,984,117 B2
(45) Date of Patent: May 29, 2018

(54) M2M DATA PROCESSING METHOD, DEVICE, AND SYSTEM

(71) Applicants: Huawei Technologies Co., Ltd., Shenzhen (CN); University of Electronic Science and Technology of China, Chengdu (CN)

(72) Inventors: Yang Xu, Chengdu (CN); Xuemei Hu, Chengdu (CN); Yan Li, Chengdu (CN)

(73) Assignees: Huawei Technologies Co., Ltd., Shenzhen (CN); University of Electronic Science and Technology of China, Chengdu (CN)

( * ) Notice: Subject to any disclaimer, the term of this patent is extended or adjusted under 35 U.S.C. 154(b) by 0 days. days.

(21) Appl. No.: 15/669,479

(22) Filed: Aug. 4, 2017

(65) Prior Publication Data

US 2017/0337242 A1 Nov. 23, 2017

Related U.S. Application Data

(63) Continuation of application No. PCT/CN2015/072320, filed on Feb. 5, 2015.

(51) Int. Cl.
*H04W 4/00* (2018.01)
*G06F 17/30* (2006.01)
*H04W 8/22* (2009.01)

(52) U.S. Cl.
CPC .. *G06F 17/30442* (2013.01); *G06F 17/30283* (2013.01); *G06F 17/30377* (2013.01); *H04W 4/005* (2013.01); *H04W 8/22* (2013.01)

(58) Field of Classification Search
CPC ....... H04W 4/005; H04W 4/006; H04W 8/22; H04W 60/00; H04W 60/04; H04W 8/04;
(Continued)

(56) References Cited

U.S. PATENT DOCUMENTS

2014/0280671 A1 9/2014 Nicholson et al.
2014/0310398 A1 10/2014 Zhou et al.
(Continued)

FOREIGN PATENT DOCUMENTS

CN 102158551 A 8/2011
CN 102281584 A 12/2011
(Continued)

OTHER PUBLICATIONS

Knuth, "Searching; 6.5 Retrieval on Secondary Keys," Sorting and Searching, vol. 3, pp. 550-557, XP002374954, (1973).

*Primary Examiner* — Huy C Ho
(74) *Attorney, Agent, or Firm* — Leydig, Voit & Mayer, Ltd.

(57) ABSTRACT

The present invention provides an M2M data processing method. The method includes: receiving a registration request sent by an M2M device; obtaining a filled capability model according to a capability model and capability information of the M2M device after authentication on the registration request succeeds, where the capability model includes three types of capabilities: a communication capability, a control capability, and a measurement capability, each capability is divided into multiple subentries, and the filled capability model describes at least one subentry corresponding to three types of capabilities of the M2M device; updating an overall capability model according to the filled capability model, where capability information of all registered M2M devices managed by an M2M service platform is recorded in the overall capability model in a type division manner of the capability model.

32 Claims, 16 Drawing Sheets

(58) Field of Classification Search
CPC ....... H04W 8/26; H04W 36/14; H04W 48/18; H04W 88/06
USPC .................................................... 455/435.1
See application file for complete search history.

(56) References Cited

U.S. PATENT DOCUMENTS

| | | | | |
|---|---|---|---|---|
| 2014/0344451 | A1* | 11/2014 | Luft | H04W 4/00 709/224 |
| 2015/0055640 | A1* | 2/2015 | Wang | H04W 4/005 370/338 |
| 2016/0192111 | A1* | 6/2016 | Choi | H04W 76/022 455/507 |

FOREIGN PATENT DOCUMENTS

| | | | |
|---|---|---|---|
| CN | 102654765 | A | 9/2012 |
| CN | 103095823 | A | 5/2013 |
| CN | 103327080 | A | 9/2013 |
| CN | 103810338 | A | 5/2014 |

* cited by examiner

M2M DATA PROCESSING METHOD, DEVICE, AND SYSTEM

CROSS-REFERENCE TO RELATED APPLICATIONS

This application is a continuation of International Application No. PCT/CN2015/072320, filed on Feb. 5, 2015, the disclosure of which is hereby incorporated by reference in its entirety.

TECHNICAL FIELD

The present invention relates to the field of communications, and in particular, to an M2M data processing method, device, and system.

BACKGROUND

A machine-to-machine (Machine to Machine, M2M for short) technology is a networked application technology using intelligent interaction between machines as a core. With development of the M2M technology, higher requirements are imposed on various capabilities of an M2M device in M2M communications.

In an existing M2M system, a newly-added M2M device first needs to send a registration request to an M2M service platform. The registration request includes capability information for describing various capabilities of the M2M device. When determining that the M2M device can register with the M2M service platform, the M2M service platform stores, in a corresponding database, a correspondence between an identifier of the M2M device and the capability information of the M2M device. When an M2M device on which an application program (app) is installed sends a query request to the M2M service platform, the M2M service platform sequentially queries, according to a query condition (such as a condition of meeting a preset capability) carried in the query request, correspondences that are recorded in the database and that are between identifiers of M2M devices and capability information of various capabilities of the M2M devices, so as to obtain a device that meets the query condition.

However, in the existing M2M system, the M2M service platform stores, in a corresponding sub-database, the correspondences between identifiers of M2M devices and capability information of the M2M devices. As a result, during a query, massive data queries need to be performed on capability information that is of all capabilities and that is stored in the database. Therefore, a query latency is relatively long, and hardware resources of the M2M service platform are wasted.

SUMMARY

The present invention provides an M2M data processing method, device, and system, so as to resolve a problem that a query latency is relatively long and hardware resources of the M2M service platform are wasted. The technical solutions are as follows:

According to a first aspect, a machine-to-machine M2M data processing method is provided, is applied to an M2M service platform, and includes:

receiving a registration request sent by an M2M device;

obtaining a filled capability model according to a capability model and capability information of the M2M device after authentication on the registration request succeeds, where the capability model includes three types of capabilities: a communication capability, a control capability, and a measurement capability, each capability is divided into multiple subentries according to a preset rule, and the filled capability model describes at least one subentry corresponding to a communication capability, a control capability, and a measurement capability of the M2M device; and updating an overall capability model according to the filled capability model, where capability information of all registered M2M devices managed by the M2M service platform is recorded in the overall capability model in a type division manner of the capability model.

With reference to the first aspect, in a first implementable manner of the first aspect, the obtaining a filled capability model according to a capability model and capability information of the M2M device includes:

sending the capability model to the M2M device, so that the M2M device fills the capability model according to the capability information of the M2M device to obtain the filled capability model; and receiving the filled capability model sent by the M2M device.

With reference to the first implementable manner of the first aspect, in a second implementable manner of the first aspect, the registration request includes a model filling capability identifier, and the model filling capability identifier is used to indicate whether the M2M device has a model filling capability; and the sending the capability model to the M2M device includes:

determining, according to the model filling capability identifier, whether the M2M device has the model filling capability; and sending the capability model to the M2M device if the M2M device has the model filling capability.

With reference to the first aspect, in a third implementable manner of the first aspect, the registration request includes the capability information of the M2M device; and the obtaining a filled capability model according to a capability model and capability information of the M2M device includes:

filling, by the M2M service platform, the capability model with the capability information of the M2M device to obtain the filled capability model.

With reference to any one of the first aspect, or the first to the third implementable manners of the first aspect, in a fourth implementable manner of the first aspect, after the updating an overall capability model according to the filled capability model, the method further includes:

receiving a query condition sent by an application program, where the application program is installed on the M2M device;

searching the overall capability model according to the query condition, and using a device that meets the query condition as a to-be-queried device; and sending an identifier of the to-be-queried device to the application program of the M2M device.

With reference to the fourth implementable manner of the first aspect, in a fifth implementable manner of the first aspect, a subentry of each capability in a communication capability, a control capability, and a measurement capability in the overall capability model includes a type subentry and at least one data subentry; the type subentry is used to describe a semantic meaning of each capability, and the at least one data subentry is used to describe a practical meaning of each capability; a capability field model is established on the M2M service platform, and the capability field model describes a capability category of each capability in the communication capability, the control capability, and the measurement capability; a described type subentry of a subentry of each capability in the overall capability model is associated with a capability category of a corresponding capability in the capability field model; the query condition includes a capability category of at least one capability in the communication capability, the control capability, and the measurement capability; and the searching the overall capability model according to the query condition, and using a device that meets the query condition as a to-be-queried device includes:

querying, according to the query condition, a capability category that is in the capability field model and indicated by the query condition;

searching, according to the capability category indicated by the query condition, the overall capability model for a type subentry that is associated with the capability category indicated by the query condition, and using the type subentry as a to-be-queried type subentry; and searching the overall capability model according to the to-be-queried type subentry, and using, as the to-be-queried device, a device on which the to-be-queried type subentry is described.

With reference to the fifth implementable manner of the first aspect, in a sixth implementable manner of the first aspect, a data subentry in the control capability in the overall capability model describes control commands corresponding to all the registered M2M devices, and after the sending an identifier of the to-be-queried device to the application program, the method further includes:

receiving control information sent by the application program, where the control information includes an identifier of the target M2M device and an instruction parameter, and the target M2M device is selected by the application program from the device corresponding to the identifier of the to-be-queried device;

querying the at least one data subentry in the control capability in the overall capability model according to the identifier of the target M2M device to obtain a control command corresponding to the target M2M device;

generating a target control command according to the instruction parameter and the control command;

sending the target control command to the target M2M device according to the identifier of the target M2M device, so that the target M2M device performs an action instructed by the target control command and generates feedback data;

receiving the feedback data sent by the target M2M device; and sending the feedback data to the application program.

With reference to the fifth implementable manner of the first aspect, in a seventh implementable manner of the first aspect, a type subentry of the communication capability in the overall capability model is a communication type subentry, and at least one data subentry of the communication capability in the overall capability model includes: a communication medium subentry, a communication range subentry, a communication manner subentry, and a communication protocol subentry; and a type subentry of the control capability in the overall capability model is a control type subentry, a data subentry of the control capability in the overall capability model describes control commands corresponding to all the registered M2M devices, and each control command includes next-level subentries such as a command description subentry, a method subentry, a uniform resource identifier URI subentry, and a parameter subentry.

According to a second aspect, an M2M data processing method is provided, is applied to an M2M device, and includes:

sending a registration request to an M2M service platform, so that the M2M service platform obtains a filled capability model according to a capability model and capability information of the M2M device after authentication on the registration request succeeds, and updates an overall capability model according to the filled capability model, where the capability model includes three types of capabilities: a communication capability, a control capability, and a measurement capability, and each capability is divided into multiple subentries according to a preset rule; the filled capability model describes at least one subentry corresponding to a communication capability, a control capability, and a measurement capability of the M2M device; and capability information of all registered M2M devices managed by the M2M service platform is recorded in the overall capability model in a type division manner of the capability model.

With reference to the second aspect, in a first implementable manner of the second aspect, after the sending a registration request to an M2M service platform, the method further includes:

receiving the capability model sent by the M2M service platform;

filling the capability model according to the capability information of the M2M device to obtain the filled capability model; and sending the filled capability model to the M2M service platform.

With reference to the first implementable manner of the second aspect, in a second implementable manner of the second aspect, the registration request includes a model filling capability identifier, and the model filling capability identifier is used to indicate whether the M2M device has a model filling capability.

With reference to the second aspect, in a third implementable manner of the second aspect, the registration request includes the capability information of the M2M device.

With reference to any one of the second aspect, or the first to the third implementable manners of the second aspect, in a fourth implementable manner of the second aspect, an application program is installed on the M2M device; and after the sending a registration request to an M2M service platform, the method further includes:

sending a query condition to the M2M service platform by using the application program, so that the M2M service platform searches the overall capability model according to the query condition, uses a device that meets the query condition as a to-be-queried device, and sends an identifier of the to-be-queried device to the application program.

With reference to the fourth implementable manner of the second aspect, in a fifth implementable manner of the second aspect, a subentry of each capability in a communication capability, a control capability, and a measurement capability in the overall capability model includes a type subentry and at least one data subentry; the type subentry is used to describe a semantic meaning of each capability, and the at least one data subentry is used to describe a practical meaning of each capability; a capability field model is established on the M2M service platform, and the capability field model describes a capability category of each capability in the communication capability, the control capability, and the measurement capability; a described type subentry of a subentry of each capability in the overall capability model is associated with a capability category of a corresponding capability in the capability field model; and the query condition includes a capability category of at least one capability in the communication capability, the control capability, and the measurement capability.

With reference to the fifth implementable manner of the second aspect, in a sixth implementable manner of the second aspect, a data subentry in the control capability in the overall capability model describes control commands corresponding to all the registered M2M devices, and after the identifier that is of the to-be-queried device and sent by the M2M service platform is received, the method further includes:

selecting a target M2M device from the device corresponding to the identifier of the to-be-queried device;

sending control information to the M2M service platform, where the control information includes an identifier of the target M2M device and an instruction parameter, so that the M2M service platform queries the at least one data subentry in the control capability in the overall capability model according to the identifier of the target M2M device to obtain a control command corresponding to the target M2M device, generates a target control command according to the instruction parameter and the control command, and sends the target control command to the target M2M device according to the identifier of the target M2M device; and receiving feedback data sent by the M2M service platform, where after the target M2M device performs an action instructed by the target control command, the feedback data is generated and sent to the M2M service platform.

With reference to the fifth implementable manner of the second aspect, in a seventh implementable manner of the second aspect, a type subentry of the communication capability in the overall capability model is a communication type subentry, and at least one data subentry of the communication capability in the overall capability model includes: a communication medium subentry, a communication range subentry, a communication manner subentry, and a communication protocol subentry; and a type subentry of the control capability in the overall capability model is a control type subentry, a data subentry of the control capability in the overall capability model describes control commands corresponding to all the registered M2M devices, and each control command includes next-level subentries such as a command description subentry, a method subentry, a URI subentry, and a parameter subentry.

According to a third aspect, an M2M data processing device is provided, is applied to an M2M service platform, and includes:

a first receiving unit, configured to receive a registration request sent by an M2M device;

an obtaining unit, configured to obtain a filled capability model according to a capability model and capability information of the M2M device after authentication on the registration request succeeds, where the capability model includes three types of capabilities: a communication capability, a control capability, and a measurement capability, each capability is divided into multiple subentries according to a preset rule, and the filled capability model describes at least one subentry corresponding to a communication capability, a control capability, and a measurement capability of the M2M device; and an update unit, configured to update an overall capability model according to the filled capability model, where capability information of all registered M2M devices managed by the M2M service platform is recorded in the overall capability model in a type division manner of the capability model.

With reference to the third aspect, in a first implementable manner of the third aspect, the obtaining unit includes:

a sending subunit, configured to send the capability model to the M2M device, so that the M2M device fills the capability model according to the capability information of the M2M device to obtain the filled capability model; and a receiving subunit, configured to receive the filled capability model sent by the M2M device.

With reference to the first implementable manner of the third aspect, in a second implementable manner of the third aspect, the registration request includes a model filling capability identifier, and the model filling capability identifier is used to indicate whether the M2M device has a model filling capability; and the sending subunit is specifically configured to:

determine, according to the model filling capability identifier, whether the M2M device has the model filling capability; and send the capability model to the M2M device if the M2M device has the model filling capability.

With reference to the third aspect, in a third implementable manner of the third aspect, the registration request includes the capability information of the M2M device; and the obtaining unit includes:

a filling subunit, configured to fill the capability model with the capability information of the M2M device to obtain the filled capability model.

With reference to any one of the third aspect, or the first to the third implementable manners of the third aspect, in a fourth implementable manner of the third aspect, the device further includes:

a second receiving unit, configured to receive a query condition sent by an application program, where the application program is installed on the M2M device;

a first querying unit, configured to search the overall capability model according to the query condition, and use a device that meets the query condition as a to-be-queried device; and a first sending unit, configured to send an identifier of the to-be-queried device to the application program of the M2M device.

With reference to the fourth implementable manner of the third aspect, in a fifth implementable manner of the third aspect, a subentry of each capability in a communication capability, a control capability, and a measurement capability in the overall capability model includes a type subentry and at least one data subentry; the type subentry is used to describe a semantic meaning of each capability, and the at least one data subentry is used to describe a practical meaning of each capability; a capability field model is established on the M2M service platform, and the capability field model describes a capability category of each capability in the communication capability, the control capability, and the measurement capability; a described type subentry of a subentry of each capability in the overall capability model is associated with a capability category of a corresponding capability in the capability field model; the query condition includes a capability category of at least one capability in the communication capability, the control capability, and the measurement capability; and the first querying unit includes:

a querying subunit, configured to query, according to the query condition, a capability category that is in the capability field model and indicated by the query condition;

a searching subunit, configured to search, according to the capability category indicated by the query condition, the overall capability model for a type subentry that is associated with the capability category indicated by the query condition, and use the type subentry as a to-be-queried type subentry; and a determining subunit, configured to search the overall capability model according to the to-be-queried type subentry, and use, as the to-be-queried device, a device on which the to-be-queried type subentry is described.

With reference to the fifth implementable manner of the third aspect, in a sixth implementable manner of the third aspect, a data subentry in the control capability in the overall capability model describes control commands corresponding to all the registered M2M devices, and the device further includes:

a third receiving unit, configured to receive control information sent by the application program, where the control information includes an identifier of the target M2M device and an instruction parameter, and the target M2M device is selected by the application program from the device corresponding to the identifier of the to-be-queried device;

a second querying unit, configured to query at least one data subentry in the control capability in the overall capability model according to the identifier of the target M2M device to obtain a control command corresponding to the target M2M device;

a generation unit, configured to generate a target control command according to the instruction parameter and the control command;

a second sending unit, configured to send the target control command to the target M2M device according to the identifier of the target M2M device, so that the target M2M device performs an action instructed by the target control command and generates feedback data;

a fourth receiving unit, configured to receive the feedback data sent by the target M2M device; and a third sending unit, configured to send the feedback data to the application program.

With reference to the fifth implementable manner of the third aspect, in a seventh implementable manner of the third aspect, a type subentry of the communication capability in the overall capability model is a communication type subentry, and at least one data subentry of the communication capability in the overall capability model includes: a communication medium subentry, a communication range subentry, a communication manner subentry, and a communication protocol subentry; and a type subentry of the control capability in the overall capability model is a control type subentry, a data subentry of the control capability in the overall capability model describes control commands corresponding to all the registered M2M devices, and each control command includes next-level subentries such as a command description subentry, a device subentry, a URI subentry, and a parameter subentry.

According to a fourth aspect, an M2M data processing device is provided, is applied to an M2M device, and includes:

a first sending unit, configured to send a registration request to an M2M service platform, so that the M2M service platform obtains a filled capability model according to a capability model and capability information of the M2M device after authentication on the registration request succeeds, and updates an overall capability model according to the filled capability model, where the capability model includes three types of capabilities: a communication capability, a control capability, and a measurement capability, and each capability is divided into multiple subentries according to a preset rule; the filled capability model describes at least one subentry corresponding to a communication capability, a control capability, and a measurement capability of the M2M device; and capability information of all registered M2M devices managed by the M2M service platform is recorded in the overall capability model in a type division manner of the capability model.

With reference to the fourth aspect, in a first implementable manner of the fourth aspect, the device further includes:

a first receiving unit, configured to receive the capability model sent by the M2M service platform;

a filling unit, configured to fill the capability model according to the capability information of the M2M device to obtain the filled capability model; and a second sending unit, configured to send the filled capability model to the M2M service platform.

With reference to the first implementable manner of the fourth aspect, in a second implementable manner of the fourth aspect, the registration request includes a model filling capability identifier, and the model filling capability identifier is used to indicate whether the M2M device has a model filling capability.

With reference to the fourth aspect, in a third implementable manner of the fourth aspect, the registration request includes the capability information of the M2M device.

With reference to any one of the fourth aspect, or the first to the third implementable manners of the fourth aspect, in a fourth implementable manner of the fourth aspect, an application program is installed on the M2M device; and the device further includes:

a third sending unit, configured to send a query condition to the M2M service platform by using the application program, so that the M2M service platform searches the overall capability model according to the query condition, uses a device that meets the query condition as a to-be-queried device, and sends an identifier of the to-be-queried device to the application program.

With reference to the fourth implementable manner of the fourth aspect, in a fifth implementable manner of the fourth aspect, a subentry of each capability in a communication capability, a control capability, and a measurement capability in the overall capability model includes a type subentry and at least one data subentry; the type subentry is used to describe a semantic meaning of each capability, and the at least one data subentry is used to describe a practical meaning of each capability; a capability field model is established on the M2M service platform, and the capability field model describes a capability category of each capability in the communication capability, the control capability, and the measurement capability; a described type subentry of a subentry of each capability in the overall capability model is associated with a capability category of a corresponding capability in the capability field model; and the query condition includes a capability category of at least one capability in the communication capability, the control capability, and the measurement capability.

With reference to the fifth implementable manner of the fourth aspect, in a sixth implementable manner of the fourth aspect, a data subentry in the control capability in the overall capability model describes control commands corresponding to all the registered M2M devices, and the device further includes:

a selection unit, configured to select a target M2M device from the device corresponding to the identifier of the to-be-queried device;

a fourth sending unit, configured to send control information to the M2M service platform, where the control information includes an identifier of the target M2M device and an instruction parameter, so that the M2M service platform queries the at least one data subentry in the control capability in the overall capability model according to the identifier of the target M2M device to obtain a control command corresponding to the target M2M device, generates a target control command according to the instruction parameter and the control command, and sends the target control command to the target M2M device according to the identifier of the target M2M device; and a second receiving unit, configured to receive feedback data sent by the M2M service platform, where after the target M2M device performs an action instructed by the target control command, the feedback data is generated and sent to the M2M service platform.

With reference to the fifth implementable manner of the fourth aspect, in a seventh implementable manner of the fourth aspect, a type subentry of the communication capability in the overall capability model is a communication type subentry, and at least one data subentry of the communication capability in the overall capability model includes: a communication medium subentry, a communication range subentry, a communication manner subentry, and a communication protocol subentry; and a type subentry of the control capability in the overall capability model is a control type subentry, a data subentry of the control capability in the overall capability model describes control commands corresponding to all the registered M2M devices, and each control command includes next-level subentries such as a command description subentry, a device subentry, a URI subentry, and a parameter subentry.

According to a fifth aspect, an M2M data processing system is provided, including:

an M2M service platform and an M2M device, where
the M2M service platform includes the M2M data processing device according to any one of the third aspect and the implementable manners of the third aspect; and
the M2M device includes the M2M data processing device according to any one of the fourth aspect and the implementable manners of the fourth aspect.

According to a sixth aspect, an M2M data processing device is provided, is applied to an M2M service platform, and includes:

at least one processor, at least one network interface, a memory, and at least one communications bus, where the processor is configured to perform a program stored in the memory, and the program stored in the memory includes:
receiving a registration request sent by an M2M device;
obtaining a filled capability model according to a capability model and capability information of the M2M device after authentication on the registration request succeeds, where the capability model includes three types of capabilities: a communication capability, a control capability, and a measurement capability, each capability is divided into multiple subentries according to a preset rule, and the filled capability model describes at least one subentry corresponding to a communication capability, a control capability, and a measurement capability of the M2M device; and
updating an overall capability model according to the filled capability model, where capability information of all registered M2M devices managed by the M2M service platform is recorded in the overall capability model in a type division manner of the capability model.

With reference to the sixth aspect, in a first implementable manner of the sixth aspect, the obtaining a filled capability model according to a capability model and capability information of the M2M device includes:
sending the capability model to the M2M device, so that the M2M device fills the capability model according to the capability information of the M2M device to obtain the filled capability model; and
receiving the filled capability model sent by the M2M device.

With reference to the first implementable manner of the sixth aspect, in a second implementable manner of the sixth aspect, the registration request includes a model filling capability identifier, and the model filling capability identifier is used to indicate whether the M2M device has a model filling capability; and
the sending the capability model to the M2M device includes:
determining, according to the model filling capability identifier, whether the M2M device has the model filling capability; and
sending the capability model to the M2M device if the M2M device has the model filling capability.

With reference to the sixth aspect, in a third implementable manner of the sixth aspect, the registration request includes the capability information of the M2M device; and
the obtaining a filled capability model according to a capability model and capability information of the M2M device includes:
filling, by the M2M service platform, the capability model with the capability information of the M2M device to obtain the filled capability model.

With reference to any one of the sixth aspect, or the first to the third implementable manners of the sixth aspect, in a fourth implementable manner of the sixth aspect, after the updating an overall capability model according to the filled capability model, the program stored in the memory further includes:
receiving a query condition sent by an application program, where the application program is installed on the M2M device;
searching the overall capability model according to the query condition, and using a device that meets the query condition as a to-be-queried device; and
sending an identifier of the to-be-queried device to the application program of the M2M device.

With reference to the fourth implementable manner of the sixth aspect, in a fifth implementable manner of the sixth aspect, a subentry of each capability in a communication capability, a control capability, and a measurement capability in the overall capability model includes a type subentry and at least one data subentry; the type subentry is used to describe a semantic meaning of each capability, and the at least one data subentry is used to describe a practical meaning of each capability; a capability field model is established on the M2M service platform, and the capability field model describes a capability category of each capability in the communication capability, the control capability, and the measurement capability; a described type subentry of a subentry of each capability in the overall capability model is associated with a capability category of a corresponding capability in the capability field model; the query condition includes a capability category of at least one capability in the communication capability, the control capability, and the measurement capability; and the searching the overall capability model according to the query condition, and using a device that meets the query condition as a to-be-queried device includes:

querying, according to the query condition, a capability category that is in the capability field model and indicated by the query condition;

searching, according to the capability category indicated by the query condition, the overall capability model for a type subentry that is associated with the capability category indicated by the query condition, and using the type subentry as a to-be-queried type subentry; and searching the overall capability model according to the to-be-queried type subentry, and using, as the to-be-queried device, a device on which the to-be-queried type subentry is described.

With reference to the fifth implementable manner of the sixth aspect, in a sixth implementable manner of the sixth aspect, a data subentry in the control capability in the overall capability model describes control commands corresponding to all the registered M2M devices, and after the sending an identifier of the to-be-queried device to the application program, the program stored in the memory further includes:

receiving control information sent by the application program, where the control information includes an identifier of the target M2M device and an instruction parameter, and the target M2M device is selected by the application program from the device corresponding to the identifier of the to-be-queried device;

querying the at least one data subentry in the control capability in the overall capability model according to the identifier of the target M2M device to obtain a control command corresponding to the target M2M device;

generating a target control command according to the instruction parameter and the control command;

sending the target control command to the target M2M device according to the identifier of the target M2M device, so that the target M2M device performs an action instructed by the target control command and generates feedback data;

receiving the feedback data sent by the target M2M device; and sending the feedback data to the application program.

With reference to the fifth implementable manner of the sixth aspect, in a seventh implementable manner of the sixth aspect, a type subentry of the communication capability in the overall capability model is a communication type subentry, and at least one data subentry of the communication capability in the overall capability model includes: a communication medium subentry, a communication range subentry, a communication manner subentry, and a communication protocol subentry; and a type subentry of the control capability in the overall capability model is a control type subentry, a data subentry of the control capability in the overall capability model describes control commands corresponding to all the registered M2M devices, and each control command includes next-level subentries such as a command description subentry, a device subentry, a URI subentry, and a parameter subentry.

According to a seventh aspect, an M2M data processing device is provided, is applied to an M2M device, and includes: a transmitter, a receiver, and a processor, where the transmitter is configured to send a registration request to an M2M service platform, so that the M2M service platform obtains a filled capability model according to a capability model and capability information of the M2M device after authentication on the registration request succeeds, and updates an overall capability model according to the filled capability model, where the capability model includes three types of capabilities: a communication capability, a control capability, and a measurement capability, and each capability is divided into multiple subentries according to a preset rule; the filled capability model describes at least one subentry corresponding to a communication capability, a control capability, and a measurement capability of the M2M device; and capability information of all registered M2M devices managed by the M2M service platform is recorded in the overall capability model in a type division manner of the capability model.

With reference to the seventh aspect, in a first implementable manner of the seventh aspect, the receiver is configured to receive the capability model sent by the M2M service platform;

the processor is configured to fill the capability model according to the capability information of the M2M device to obtain the filled capability model; and the transmitter is further configured to send the filled capability model to the M2M service platform.

With reference to the first implementable manner of the seventh aspect, in a second implementable manner of the seventh aspect, the registration request includes a model filling capability identifier, and the model filling capability identifier is used to indicate whether the M2M device has a model filling capability.

With reference to the seventh aspect, in a third implementable manner of the seventh aspect, the registration request includes the capability information of the M2M device.

With reference to any one of the seventh aspect, or the first to the third implementable manners of the seventh aspect, in a fourth implementable manner of the seventh aspect, an application program is installed on the M2M device; and the transmitter is further configured to:

sending a query condition to the M2M service platform by using the application program, so that the M2M service platform searches the overall capability model according to the query condition, uses a device that meets the query condition as a to-be-queried device, and sends an identifier of the to-be-queried device to the application program.

With reference to the fourth implementable manner of the seventh aspect, in a fifth implementable manner of the seventh aspect, a subentry of each capability in a communication capability, a control capability, and a measurement capability in the overall capability model includes a type subentry and at least one data subentry; the type subentry is used to describe a semantic meaning of each capability, and the at least one data subentry is used to describe a practical meaning of each capability; a capability field model is established on the M2M service platform, and the capability field model describes a capability category of each capability in the communication capability, the control capability, and the measurement capability; a described type subentry of a subentry of each capability in the overall capability model is associated with a capability category of a corresponding capability in the capability field model; and the query condition includes a capability category of at least one capability in the communication capability, the control capability, and the measurement capability.

With reference to the fifth implementable manner of the seventh aspect, in a sixth implementable manner of the seventh aspect, a data subentry in the control capability in the overall capability model describes control commands corresponding to all the registered M2M devices;

the processor is configured to select a target M2M device from the device corresponding to the identifier of the to-be-queried device;

the transmitter is further configured to send control information to the M2M service platform, where the control information includes an identifier of the target M2M device and an instruction parameter, so that the M2M service platform queries the at least one data subentry in the control capability in the overall capability model according to the identifier of the target M2M device to obtain a control command corresponding to the target M2M device, generates a target control command according to the instruction parameter and the control command, and sends the target control command to the target M2M device according to the identifier of the target M2M device; and the receiver is configured to receive feedback data sent by the M2M service platform, where after the target M2M device performs an action instructed by the target control command, the feedback data is generated and sent to the M2M service platform.

With reference to the fifth implementable manner of the seventh aspect, in a seventh implementable manner of the seventh aspect, a type subentry of the communication capability in the overall capability model is a communication type subentry, and at least one data subentry of the communication capability in the overall capability model includes: a communication medium subentry, a communication range subentry, a communication manner subentry, and a communication protocol subentry; and a type subentry of the control capability in the overall capability model is a control type subentry, a data subentry of the control capability in the overall capability model describes control commands corresponding to all the registered M2M devices, and each control command includes next-level subentries such as a command description subentry, a device subentry, a URI subentry, and a parameter subentry.

According to an eighth aspect, an M2M data processing system is provided, including:

an M2M service platform and an M2M device, where the M2M service platform includes the M2M data processing device according to any one of the sixth aspect and the implementable manners of the sixth aspect; and the M2M device includes the M2M data processing device according to any one of the seventh aspect and the implementable manners of the seventh aspect.

The present invention provides an M2M data processing method, device, and system. A capability model includes three types of capabilities: a communication capability, a control capability, and a measurement capability, and each capability is divided into multiple subentries according to a preset rule. Therefore, a filled capability model obtained according to the capability model and capability information of an M2M device is also divided in a type division manner of the capability model; and an overall capability model updated by using the filled capability model is also divided in the type division manner of the capability model. In this case, a query may be performed by the type without massive data queries. Therefore, a query latency and waste of hardware resources of an M2M service platform are reduced.

It should be understood that general description above and detailed description below are merely examples and explanatory, and do not limit the present invention.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

Specific embodiments of the present invention have been shown in the foregoing accompanying drawings, and more detailed description is provided below. These accompanying drawings and text description are not for limiting the protection scope of the present invention in any manner but describe the concept of the present invention to a skilled person in the art with reference to the specific embodiments.

DESCRIPTION OF EMBODIMENTS

To make the objectives, technical solutions, and advantages of the present invention clearer, the following further describes the embodiments of the present invention in detail with reference to the accompanying drawings.

Figure 1:
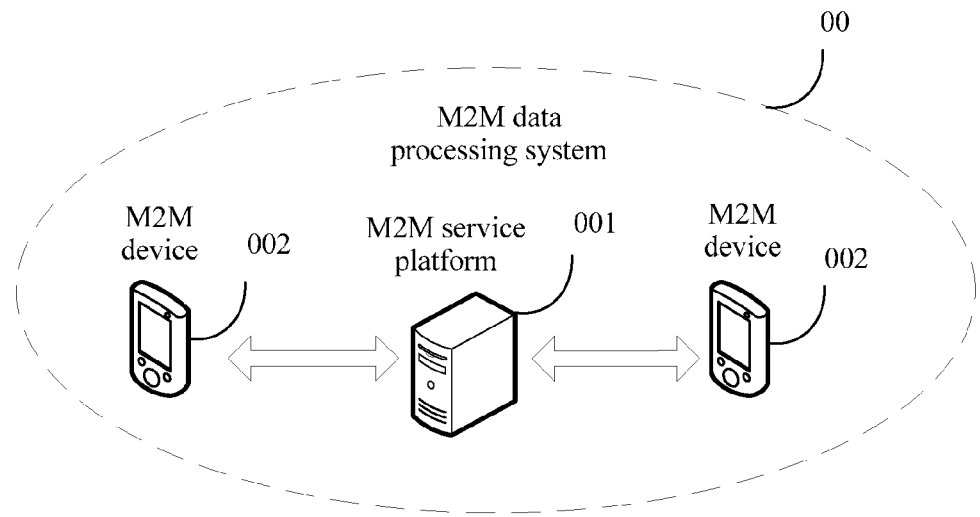
FIG. 1 is a schematic structural diagram of an M2M data processing system related in an M2M data processing method according to an embodiment of the present invention.

FIG. 1 shows a schematic structural diagram of an M2M data processing system 00 related in an M2M data processing method according to an embodiment of the present invention. The M2M data processing system 00 uses an M2M technology. The M2M technology is a networked application technology whose core is intelligent interaction between machines. The M2M data processing system organically combines different types of communications technologies by using the M2M technology, so as to implement communication between machines. The M2M data processing system 00 includes an M2M service platform (Service Platform) 001 and at least two M2M devices 002. The at least two M2M devices 002 include at least one M2M device on which an application program is installed. The M2M service platform is configured to manage all M2M devices in the M2M data processing system. The M2M device on which the application program is installed has a device query function and a control function.

The M2M devices 002 may be machine devices such as a cell phone, a phone, a computer, and a fax machine. The M2M device on which the application program is installed may send a query request and a control command to the M2M service platform 001. The control command may be sent to a corresponding destination M2M device by using the M2M service platform, so as to control the destination M2M device to perform an action instructed by the control command, for example, temperature adjustment and humidity measurement.

An existing International Organization for Standardization, OneM2M, is devoted to put forward an M2M system based on an M2M application technology. In a OneM2M environment, the M2M service platform 001 in the M2M data processing system shown in FIG. 1 is a common service entity (Common Service Entity, CSE for short). The CSE is an entity that includes a group of common service function (Common Service Function, CSF for short) modules specified in the OneM2M environment. The CSE is configured to manage all M2M devices in the M2M data processing system and can implement communication between the M2M device on which the application program is installed and the destination M2M device.

Figure 2:
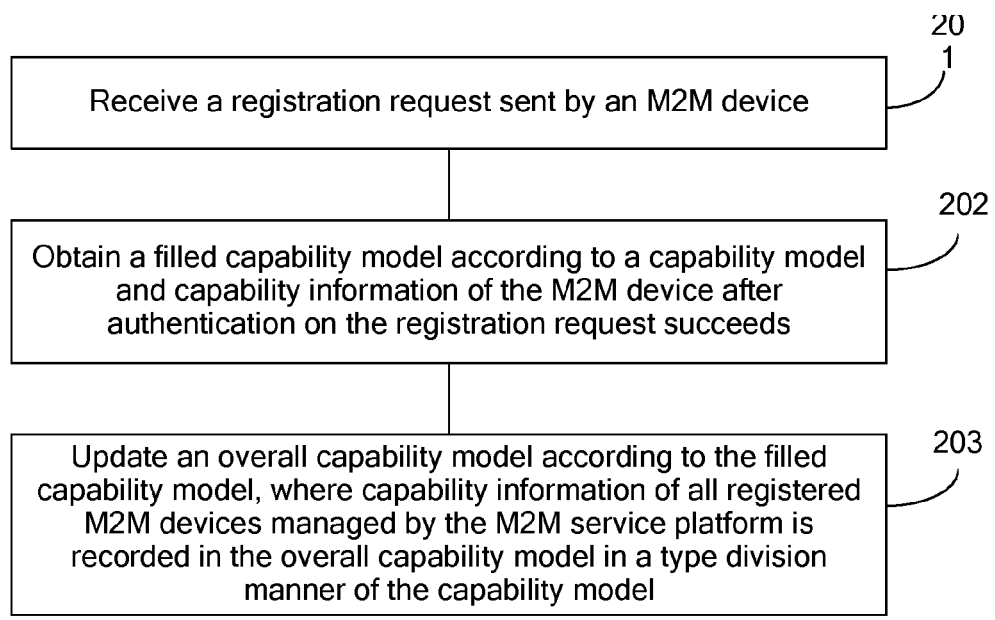
FIG. 2 is a flowchart of an M2M data processing method according to an embodiment of the present invention.

An embodiment of the present invention provides an M2M data processing method, where the method is applied to an M2M service platform. As shown in FIG. 2, the method includes the following steps.

Step 201: Receive a registration request sent by an M2M device.

Step 202: Obtain a filled capability model according to a capability model and capability information of the M2M device after authentication on the registration request succeeds.

The capability model (Capability Model) includes three types of capabilities: a communication capability, a control capability, and a measurement capability. Each capability is divided into multiple subentries according to a preset rule. The filled capability model describes at least one subentry corresponding to a communication capability, a control capability, and a measurement capability of the M2M device.

Step 203: Update an overall capability model according to the filled capability model, where capability information of all registered M2M devices managed by the M2M service platform is recorded in the overall capability model in a type division manner of the capability model.

In conclusion, according to the M2M data processing method provided in this embodiment of the present invention, a capability model includes three types of capabilities: a communication capability, a control capability, and a measurement capability, and each capability is divided into multiple subentries according to a preset rule. Therefore, a filled capability model obtained according to the capability model and capability information of an M2M device is also divided in a type division manner of the capability model; and an overall capability model updated by using the filled capability model is also divided in the type division manner of the capability model. In this case, a query may be performed by the type without massive data queries. Therefore, a query latency and waste of hardware resources of an M2M service platform are reduced.

In one aspect, the M2M device may fill the capability model, and step 202 may include: sending the capability model to the M2M device, so that the M2M device fills the capability model according to the capability information of the M2M device to obtain the filled capability model; and receiving the filled capability model sent by the M2M device.

Particularly, the registration request in step 201 may include: a model filling capability identifier, the model filling capability identifier is used to indicate whether the M2M device has a model filling capability, and the sending the capability model to the M2M device may include: determining, according to the model filling capability identifier, whether the M2M device has the model filling capability; and sending the capability model to the M2M device if the M2M device has the model filling capability.

In another aspect, the M2M service platform may fill the capability model. Generally, the M2M service platform fills the capability model only when the M2M device does not have a model filling function. The registration request in step 201 may include the capability information of the M2M device, and step 202 may include: filling, by the M2M service platform, the capability model with the capability information of the M2M device to obtain the filled capability model.

Further, after step 203, the M2M device on which an application program is installed may further query a destination M2M device, and a specific method includes: receiving a query condition sent by the application program, where the application program is installed on the M2M device; searching the overall capability model according to the query condition, and using a device that meets the query condition as a to-be-queried device; and sending an identifier of the to-be-queried device to the application program.

It should be noted that a subentry of each capability in a communication capability, a control capability, and a measurement capability in the overall capability model includes a type subentry and at least one data subentry. The type subentry is used to describe a semantic meaning of each capability, and the at least one data subentry is used to describe a practical meaning of each capability. A capability field model is established on the M2M service platform, and the capability field model describes a capability category of each capability in the communication capability, the control capability, and the measurement capability. A described type subentry of a subentry of each capability in the overall capability model is associated with a capability category of a corresponding capability in the capability field model. The query condition includes a capability category of at least one capability in the communication capability, the control capability, and the measurement capability. For example, a type subentry of the communication capability in the overall capability model is a communication type subentry, and at least one data subentry of the communication capability in the overall capability model includes: a communication medium subentry, a communication range subentry, a communication manner subentry, and a communication protocol subentry; and a type subentry of the control capability in the overall capability model is a control type subentry, a data subentry of the control capability in the overall capability model describes control commands corresponding to all the registered M2M devices, and each control command includes next-level subentries such as a command description subentry, a method subentry, a uniform resource identifier (Uniform Resource Identifier, URI for short) subentry, and a parameter subentry.

Correspondingly, the searching the overall capability model according to the query condition, and using a device that meets the query condition as a to-be-queried device may include:

querying, according to the query condition, a capability category that is in the capability field model and indicated by the query condition; searching, according to the capability category indicated by the query condition, the overall capability model for a type subentry that is associated with the capability category indicated by the query condition, and using the type subentry as a to-be-queried type subentry; and searching the overall capability model according to the to-be-queried type subentry, and using, as the to-be-queried device, a device on which the to-be-queried type subentry is described.

Further, the data subentry in the control capability in the overall capability model describes the control commands corresponding to all the registered M2M devices, and after the identifier of the to-be-queried device is sent to the application program, the M2M device on which the application program is installed may further perform control over the target M2M device, and a specific method may include:

receiving control information sent by the application program, where the control information includes an identifier of a target M2M device and an instruction parameter, and the target M2M device is selected by the application program from the device corresponding to the identifier of the to-be-queried device; querying the at least one data subentry in the control capability in the overall capability model according to the identifier of the target M2M device to obtain a control command corresponding to the target M2M device; generating a target control command according to the instruction parameter and the control command; sending the target control command to the target M2M device according to the identifier of the target M2M device, so that the target M2M device performs an action instructed by the target control command and generates feedback data; receiving the feedback data sent by the target M2M device; and sending the feedback data to the application program.

In conclusion, according to the M2M data processing method provided in this embodiment of the present invention, a capability model includes three types of capabilities: a communication capability, a control capability, and a measurement capability, and each capability is divided into multiple subentries according to a preset rule. Therefore, a filled capability model obtained according to the capability model and capability information of an M2M device is also divided in a type division manner of the capability model; and an overall capability model updated by using the filled capability model is also divided in the type division manner of the capability model. In this case, a query may be performed by the type without massive data queries. Therefore, a query latency and waste of hardware resources of an M2M service platform are reduced.

An embodiment of the present invention provides an M2M data processing method, where the method is applied to an M2M device, and includes:

sending a registration request to an M2M service platform, so that the M2M service platform obtains a filled capability model according to a capability model and capability information of the M2M device after authentication on the registration request succeeds, and updates an overall capability model according to the filled capability model.

The capability model includes three types of capabilities: a communication capability, a control capability, and a measurement capability, and each capability is divided into multiple subentries according to a preset rule. The filled capability model describes at least one subentry corresponding to a communication capability, a control capability, and a measurement capability of the M2M device. Capability information of all registered M2M devices managed by the M2M service platform is recorded in the overall capability model in a type division manner of the capability model.

In conclusion, according to the M2M data processing method provided in this embodiment of the present invention, a capability model includes three types of capabilities: a communication capability, a control capability, and a measurement capability, and each capability is divided into multiple subentries according to a preset rule. Therefore, a filled capability model obtained according to the capability model and capability information of an M2M device is also divided in a type division manner of the capability model; and an overall capability model updated by using the filled capability model is also divided in the type division manner of the capability model. In this case, a query may be performed by the type without massive data queries. Therefore, a query latency and waste of hardware resources of an M2M service platform are reduced.

In one aspect, the M2M device may fill the capability model. After the registration request is sent to the M2M service platform, the M2M device may further receive the capability model sent by the M2M service platform, fill the capability model according to the capability information of the M2M device to obtain the filled capability model, and send the filled capability model to the M2M service platform.

Particularly, the registration request may include a model filling capability identifier, and the model filling capability identifier is used to indicate whether the M2M device has a model filling capability. In this way, the M2M service platform may determine, according to the model filling capability identifier, whether the M2M device has the model filling capability, and send the capability model to the M2M device if the M2M device has the model filling capability.

In another aspect, the M2M service platform may fill the capability model. Generally, the M2M service platform fills the capability model only when the M2M device does not have a model filling function, and the registration request includes the capability information of the M2M device. The M2M service platform fills the capability model with the capability information of the M2M device to obtain the filled capability model.

Further, an application program may be installed on the M2M device. After the registration request is sent to the M2M service platform, the M2M device on which the application program is installed may further query a destination M2M device. A specific method includes: sending a query condition to the M2M service platform by using the application program, so that the M2M service platform searches the overall capability model according to the query condition, uses a device that meets the query condition as a to-be-queried device, and sends an identifier of the to-be-queried device to the application program.

It should be noted that a subentry of each capability in a communication capability, a control capability, and a measurement capability in the overall capability model includes a type subentry and at least one data subentry. The type subentry is used to describe a semantic meaning of each capability, and the at least one data subentry is used to describe a practical meaning of each capability. A capability field model is established on the M2M service platform, and the capability field model describes a capability category of each capability in the communication capability, the control capability, and the measurement capability. A described type subentry of a subentry of each capability in the overall capability model is associated with a capability category of a corresponding capability in the capability field model. The query condition includes a capability category of at least one capability in the communication capability, the control capability, and the measurement capability. For example, a type subentry of the communication capability in the overall capability model is a communication type subentry, and at least one data subentry of the communication capability in the overall capability model includes: a communication medium subentry, a communication range subentry, a communication manner subentry, and a communication protocol subentry; and a type subentry of the control capability in the overall capability model is a control type subentry, at least one data subentry in the control capability in the overall capability model may describe the control commands corresponding to all the registered M2M devices, and each control command includes next-level subentries such as a command description subentry, a method subentry, a URI subentry, and a parameter subentry.

Further, the data subentry in the control capability in the overall capability model describes control commands corresponding to all the registered M2M devices, and after the identifier that is of the to-be-queried device and sent by the M2M service platform is received, the M2M device on which the application program is installed may further perform control over a target M2M device, and a specific method may include: selecting a target M2M device from the device corresponding to the identifier of the to-be-queried device; sending control information to the M2M service platform, where the control information includes an identifier of the target M2M device and an instruction parameter, so that the M2M service platform queries the at least one data subentry in the control capability in the overall capability model according to the identifier of the target M2M device to obtain a control command corresponding to the target M2M device, generates a target control command according to the instruction parameter and the control command, and sends the target control command to the target M2M device according to the identifier of the target M2M device; and receiving feedback data sent by the M2M service platform, where after the target M2M device performs an action instructed by the target control command, the feedback data is generated and sent to the M2M service platform.

In conclusion, according to the M2M data processing method provided in this embodiment of the present invention, a capability model includes three types of capabilities: a communication capability, a control capability, and a measurement capability, and each capability is divided into multiple subentries according to a preset rule. Therefore, a filled capability model obtained according to the capability model and capability information of an M2M device is also divided in a type division manner of the capability model; and an overall capability model updated by using the filled capability model is also divided in the type division manner of the capability model. In this case, a query may be performed by the type without massive data queries. Therefore, a query latency and waste of hardware resources of an M2M service platform are reduced.

Figure 3A:
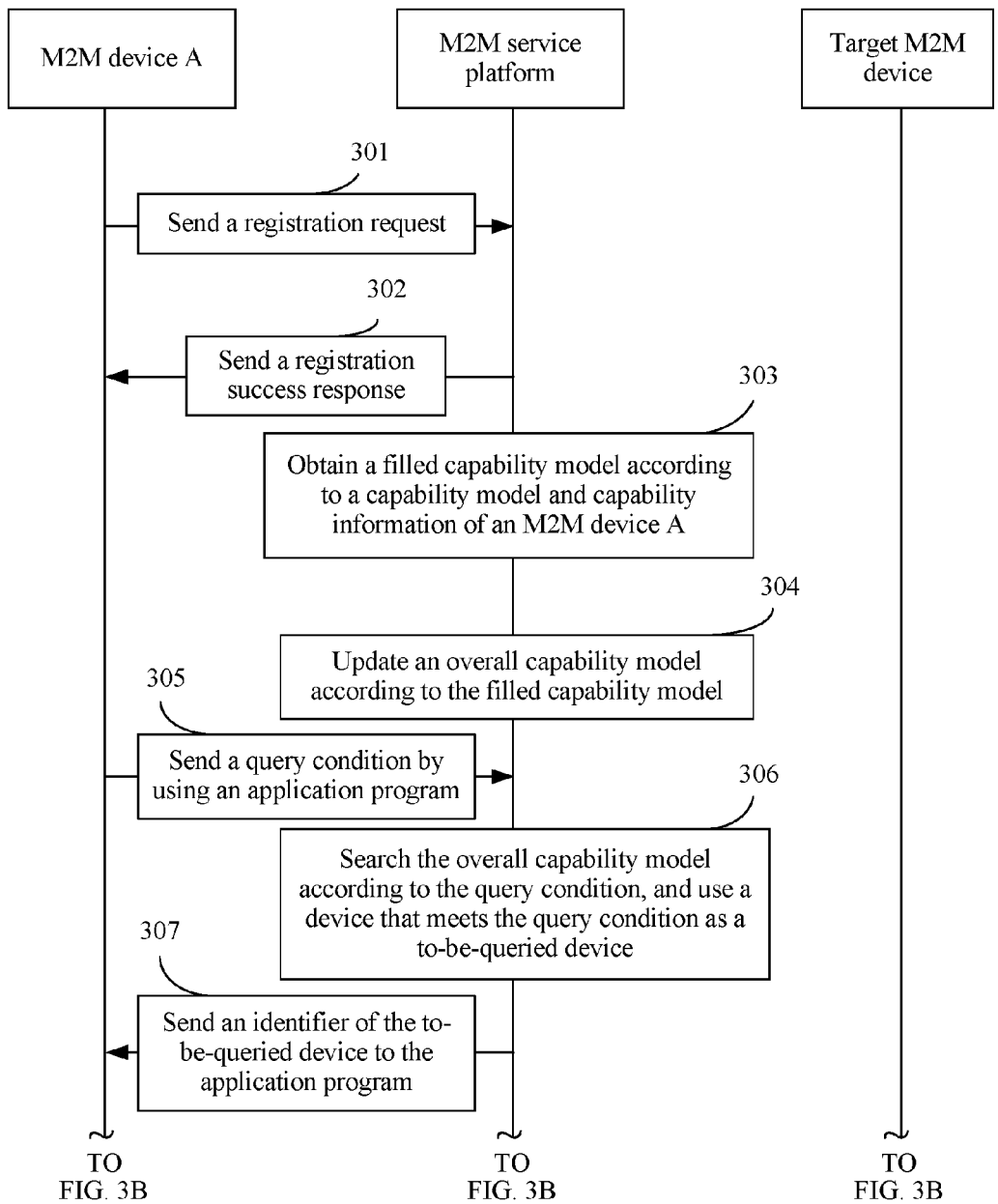
FIG. 3A and FIG. 3B are a flowchart of another M2M data processing method according to an embodiment of the present invention.
Figure 3B:
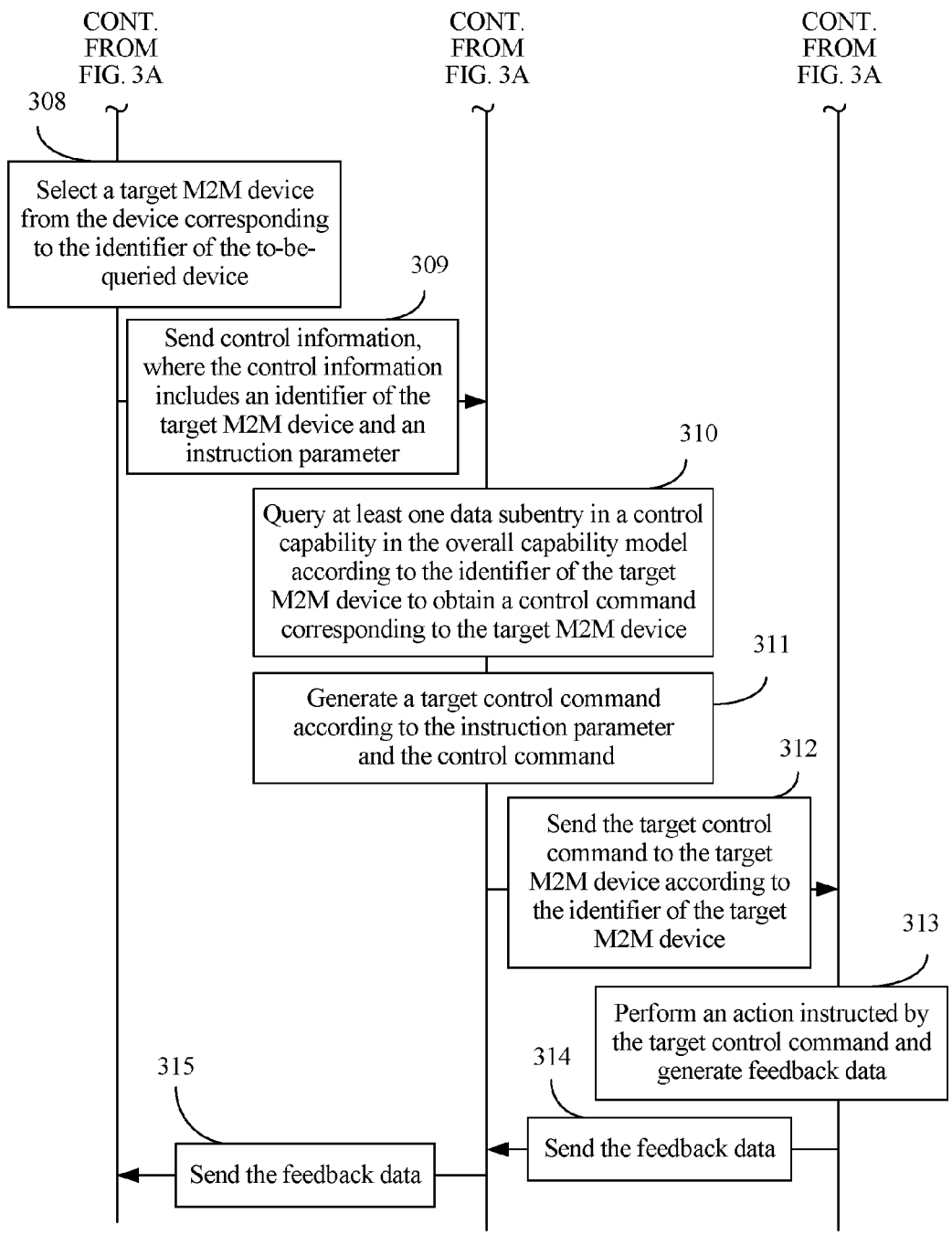

An embodiment of the present invention provides another M2M data processing method. It is assumed that an M2M data processing system includes an M2M device A, and an application program is installed on the M2M device A. The M2M device A is used as an example, and for a specific working process of another M2M device, on which an application program is installed, in the M2M data processing system, reference may be made to that of the M2M device A. As shown in FIG. 3A and FIG. 3B, the method includes the following steps.

Step 301: The M2M device A sends a registration request to an M2M service platform.

The M2M service platform in the M2M data processing system may manage all M2M devices in the M2M data processing system. When a new M2M device is added to the M2M data processing system, the new M2M device needs to register with the M2M service platform.

Step 302: The M2M service platform sends a registration success response to the M2M device A.

The registration request generally includes an identifier of the M2M device and the like. The M2M service platform processes the registration request, for example, performs authentication on the M2M device A according to the registration request. When determining that the M2M device A meets a registration condition, the M2M service platform may generate the registration success response, and send the registration success response to the M2M device A to notify the M2M device A that authentication on the registration request of the M2M device A succeeds. It should be noted that if the M2M service platform determines, after processing the registration request, that the M2M device A does not meet the registration condition, authentication on the registration request of the M2M device A fails. The M2M service platform may not respond to the registration request of the M2M device A, or generate a registration failure response and send the registration failure response to the M2M device A to notify the M2M device A that authentication on the registration request of the M2M device A fails.

Step 303. The M2M service platform obtains a filled capability model according to a capability model and capability information of the M2M device A.

In this embodiment of the present invention, a capability model is established on the M2M service platform, and the capability model is established according to a working mode of an M2M device, and existing working modes of the M2M device may include the following three types:

1. Measurement data obtaining mode: The M2M device sends an observation request to the M2M service platform, and the M2M service platform replies with measurement data.

The working mode specifically includes: The M2M device sends the observation request to the M2M service platform, and the observation request instructs a target M2M device to measure a preset parameter. The M2M service platform sends the observation request to the target M2M device, and the target M2M device measures the preset parameter and forwards, to the M2M device, measurement data generated by the target M2M device.

2. Communications mode: Obtain a data transmission protocol and transmit data according to the protocol.

The working mode specifically includes: A requesting party first sends a data transmission request to a receiving party, the receiving party replies to the requesting party with a specified data transmission protocol, and both parties start to transmit data according to the specified data transmission protocol.

3. Control mode: The M2M device sends control information to the M2M service platform, and the control information includes description of a control method. The M2M service platform sends, according to the control information, a control command to a device (that is, a target M2M device) that the M2M device expects to control.

Figure 4:
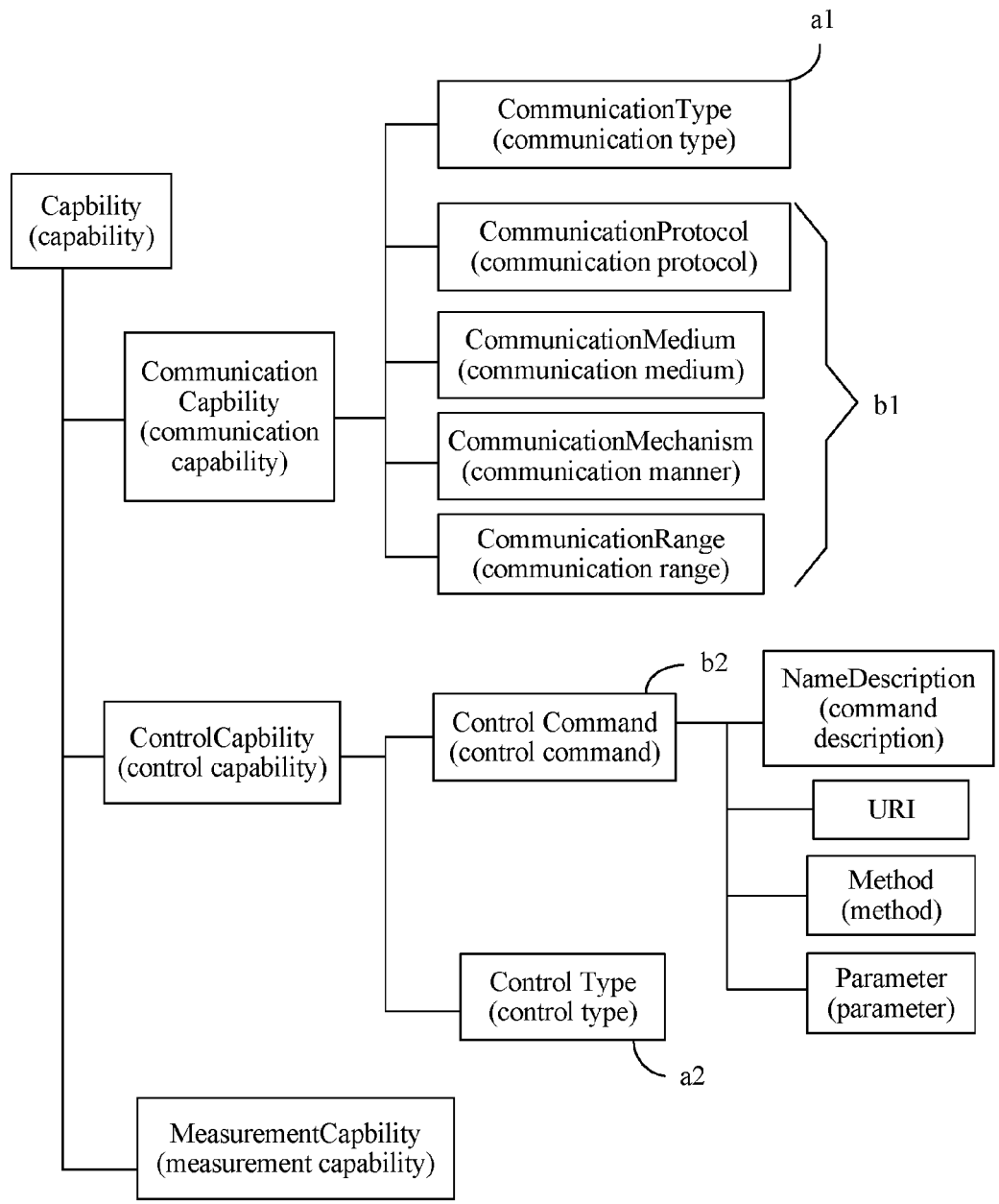
FIG. 4 is a schematic structural diagram of a capability model according to an embodiment of the present invention.

Correspondingly, as shown in FIG. 4, a capability in the capability model is divided into three types: a communication capability, a control capability, and a measurement capability. The communication capability is used to describe a feature of interaction between M2M devices. The execution capability is used to describe a feature of affecting an environment by an M2M device. The measurement capability is used to describe a measurement property of an M2M device.

Each capability in the communication capability, the control capability, and the measurement capability is divided into multiple subentries according to a preset rule. A subentry of each capability includes a type subentry and at least one data subentry, and each subentry may also include multiple next-level subentries. The type subentry is used to describe a semantic meaning (also referred to as a text meaning) of each capability, and the at least one data subentry is used to describe a practical meaning of each capability. For example, a type subentry a1 of the communication capability is a communication type (CommunicationType), and the communication type subentry indicates a type of the communication capability. At least one data subentry b1 of the communication capability includes: a communication medium (CommunicationMedium) subentry, a communication range (CommunicationRange) subentry, a communication manner (CommunicationMechanism) subentry, and a communication protocol (CommunicationProtocol) subentry. The communication medium subentry indicates a medium used for communication, for example, a wired medium, a wireless medium, or the like. The communication range subentry indicates a range in which communication can be performed, for example, a wide area or a local area. The communication manner subentry indicates a manner used for communication, for example, a simplex manner, a duplex manner, a half-duplex manner, or the like. The communication protocol subentry indicates a communication protocol used by the M2M device, for example, Wireless Fidelity (Wireless-Fidelity, WiFi for short), or the like.

For example, a type subentry a2 of the control capability is a control type (Control Type), and the control type subentry indicates type description of a control command. At least one data subentry b2 of the control capability describes a control command (Control Command), and each control command subentry includes next-level subentries such as a command description (NameDescription) subentry, a method (Method) subentry, a URI subentry, and a parameter (Parameter) subentry. The command description subentry indicates description of the control command. The method subentry indicates four operations: create (Create), read (Read), update (Update), and delete (Delete) of a representational state transfer (Representational State Transfer, REST for short) interface, or operations: get (get), put (put), post (post), and delete (delete) in the Hypertext Transfer Protocol (Hypertext transfer protocol, HTTP for short). The URI subentry indicates a URI of a device (that is, a target M2M device) on which the control command acts. The parameter subentry indicates a parameter carried by the control command.

Particularly, for the multiple subentries included in the measurement capability, reference may be made to description of semantic sensor network ontology put forward by the Semantic Sensor Network Incubator Group (The W3C Semantic Sensor Network Incubator group, the SSN-XG for short) in the prior art, and details are not described in this embodiment of the present invention.

Figure 5:
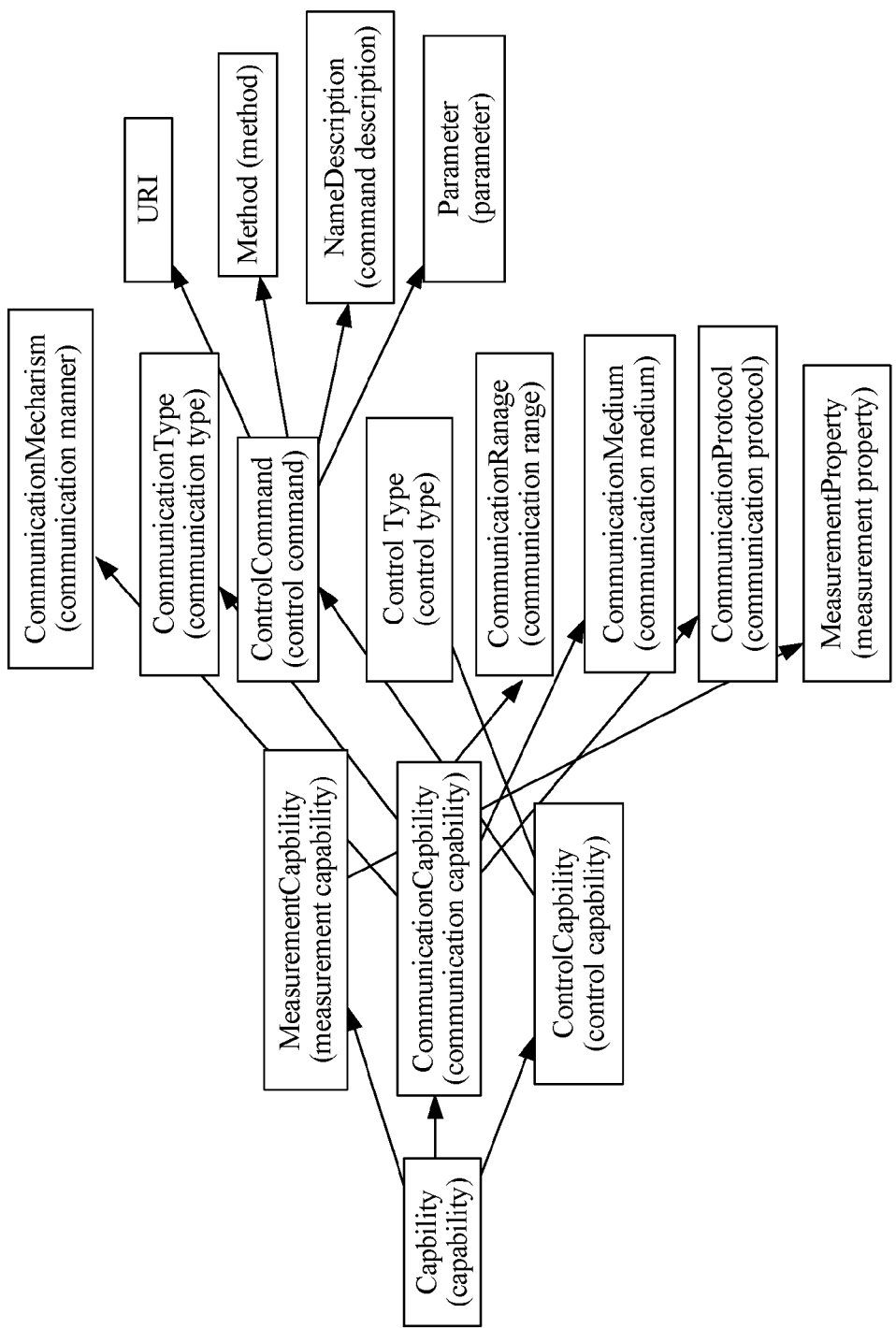
FIG. 5 is a schematic structural diagram of a capability model of an M2M data processing system in a OneM2M environment according to an embodiment of the present invention.

It should be noted that the capability model is applied to different M2M systems, and forms of capability models may be different. For example, as shown in FIG. 5, FIG. 5 shows a capability model of an M2M data processing system in a OneM2M environment, and the capability model is represented in a form of capability ontology. A capability (Capbility) in the capability model is divided into three types: a communication capability, a control capability, and a measurement capability. Each capability in the communication capability, the control capability, and the measurement capability includes multiple subentries, and each subentry may also include a next-level subentry.

For example, subentries included in the communication capability of the M2M data processing system in the OneM2M environment are separately: a communication type subentry, a communication manner subentry, a communication range subentry, a communication medium subentry, a communication protocol subentry, and the like. The measurement capability includes subentries such as a measurement property (MeasurementProperty) subentry. The control capability includes subentries such as a control command subentry and a control type subentry, and the control command subentry may further include next-level subentries such as a URI subentry, a method subentry, a command description subentry, and a parameter subentry. There are lines with arrows between different levels of types and/or subentries to indicate association between the types and/or subentries. For explanation of the types and the subentries, reference may be made to explanation in the capability model in FIG. 4.

It should be noted that a capability in the capability model is only divided, but the capability model is merely an empty framework model. For a registered M2M device, specific data of the M2M device needs to be filled to form a model that describes a capability of the M2M device, that is, a filled capability model. There may be multiple processes in which the M2M service platform obtains the filled capability model. For example, it is assumed that the following two obtaining methods exist in this embodiment of the present invention.

In one aspect, the M2M device A fills the capability model. Specifically, the M2M service platform may send the capability model to the M2M device A, and the M2M device A fills the capability model according to the capability information of the M2M device A to obtain the filled capability model. For example, the M2M device A may sequentially obtain, according to content in the capability model, specific data of a communication capability, a control capability, and a measurement capability of the M2M device A to form the capability information of the M2M device A, and fill a corresponding subentry in the capability model with the capability information of the M2M device A to obtain the filled capability model. Finally, the M2M device A sends the filled capability model to the M2M service platform.

It should be noted that capabilities of all M2M devices in the M2M data processing system may be different, and some M2M devices may not have a model filling capability and cannot fill a capability model. Therefore, the M2M service platform needs to send the capability model to the M2M device A after determining that the M2M device A has the model filling capability, so as to avoid an invalid action.

In this embodiment of the present invention, the registration request sent by the M2M device A to the M2M service platform in step 301 may include a model filling capability identifier, and the model filling capability identifier is used to indicate whether the M2M device has the model filling capability. The M2M service platform may first determine, according to the model filling capability identifier, whether the M2M device has the model filling capability, and send the capability model to the M2M device if the M2M device has the model filling capability, or does not send the capability model to the M2M device if the M2M device does not have the model filling capability. Particularly, in this embodiment of the present invention, it is assumed that a registration request sent by an M2M device with the model filling capability to the M2M service platform includes a model filling capability identifier, and the model filling capability identifier is a preset character such as "TRUE". If the M2M service platform receives a registration request including a model filling capability identifier, and the model filling capability identifier is the preset character, the M2M service platform determines that an M2M device that sends the registration request has the model filling capability. If the M2M service platform receives a registration request not including a model filling capability identifier, or the M2M service platform receives a registration request including a model filling capability identifier but the model filling capability identifier is not the preset character, the M2M service platform determines that an M2M device that sends the registration request does not have the model filling capability.

In another aspect, the service platform fills the capability model. Specifically, the registration request sent by the M2M device A to the M2M service platform in step 301 may include the capability information of the M2M device A, and the capability information may include specific data of a communication capability, a control capability, and a measurement capability of the M2M device A. The M2M service platform may fill all subentries in the capability model according to the capability information of the M2M device A to obtain the filled capability model.

Particularly, device capabilities of different M2M devices are different. For the M2M device A, the capability information of the M2M device A may include data corresponding to only a part of subentries in the communication capability, the control capability, and the measurement capability described in the capability model. Therefore, in the filled capability model obtained by means of filling according to the capability information, a part of subentries corresponding to the communication capability, the control capability, and the measurement capability of the M2M device A are filled, and content of other subentries cannot be learnt from the capability information and may be recorded as "null". Correspondingly, the filled capability model obtained by the M2M service platform describes at least one subentry in the communication capability, the control capability, and the measurement capability of the M2M device.

In the M2M data processing system in the OneM2M environment, after receiving the capability information of the M2M device A, the M2M service platform may create an <AE> resource, and use the capability information as a newly-added attribute: capability information (capabilityInformation, capabilityInfo for short) of the <AE> resource. An introduction of the newly-added attribute may be shown in Table 1. An attribute of the newly-added attribute in the <AE> is "capabilityInfo", and a quantity of the attribute is zero or one (in Table 1, "0" indicates one attribute, and "1" indicates one attribute) and the attribute has a read/write property. The newly-added attribute is used to store the capability information sent by the M2M device, and is a character string type. An attribute of the newly-added attribute in an announced (Announced, Annc for short) resource (<AEAnnc>) of an application entity (Application Entity, AE for short) is "OA". "OA" represents "optional announced" (Optional Announced, OA for short), that is, the attribute may be announced or unannounced, and whether to announce the attribute is determined by a CSE that creates the <AE> resource.

TABLE 1

| Attribute of <AE> (an attribute in the <AE>) | Multi-plicity (multi-plicity) | RW (read and write)/ RO (read only)/WO (write only) | Description (description) | <AEAnnc> Attributes (<AEAnnc> attributes) |
| --- | --- | --- | --- | --- |
| capabilityInfo | 0 . . . 1 | RW | Store capability information sent by the M2M device, a character string (string) type | OA |

Figure 6A:
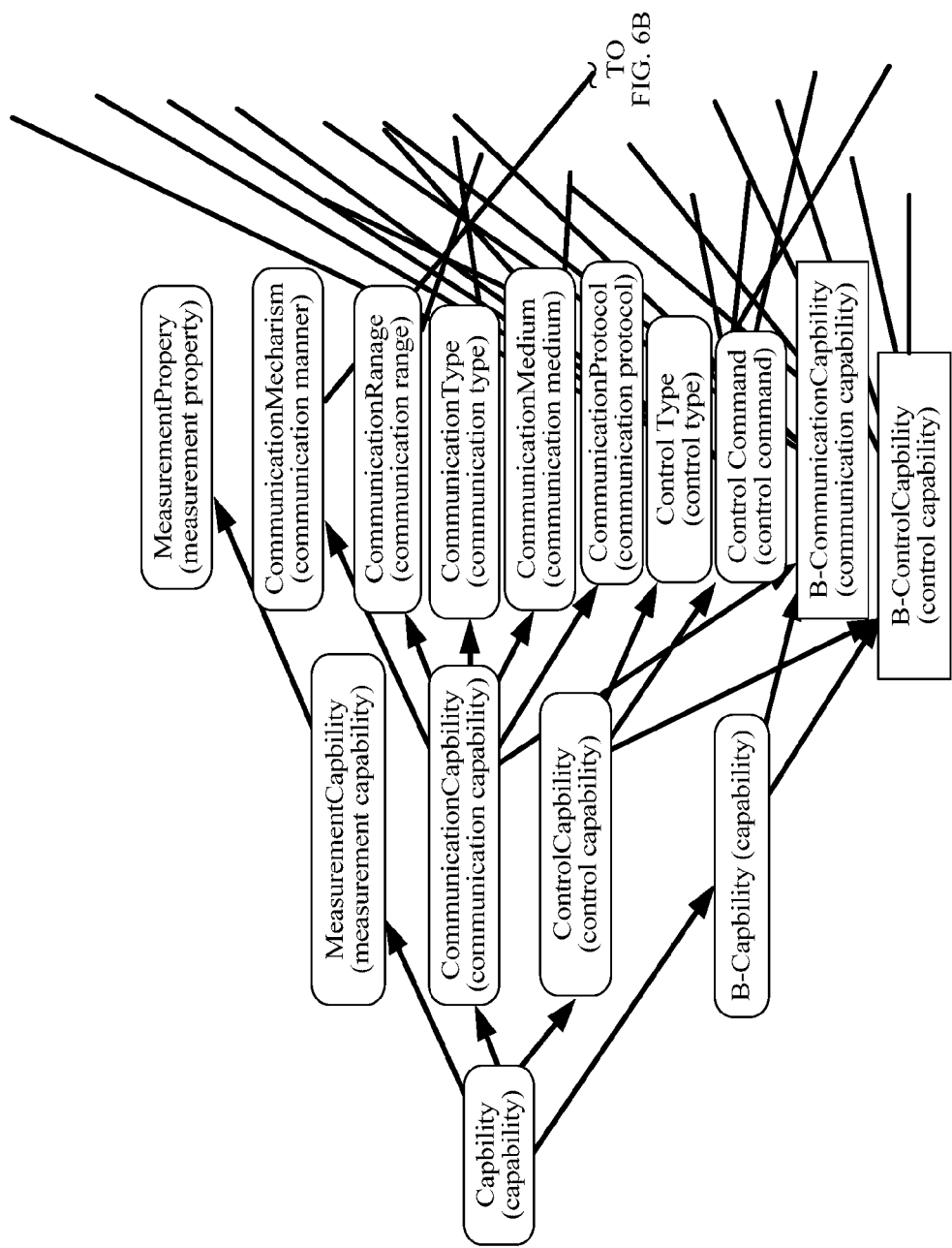
FIG. 6A and FIG. 6B are a schematic structural diagram of a filled capability model according to an embodiment of the present invention.
Figure 6B:
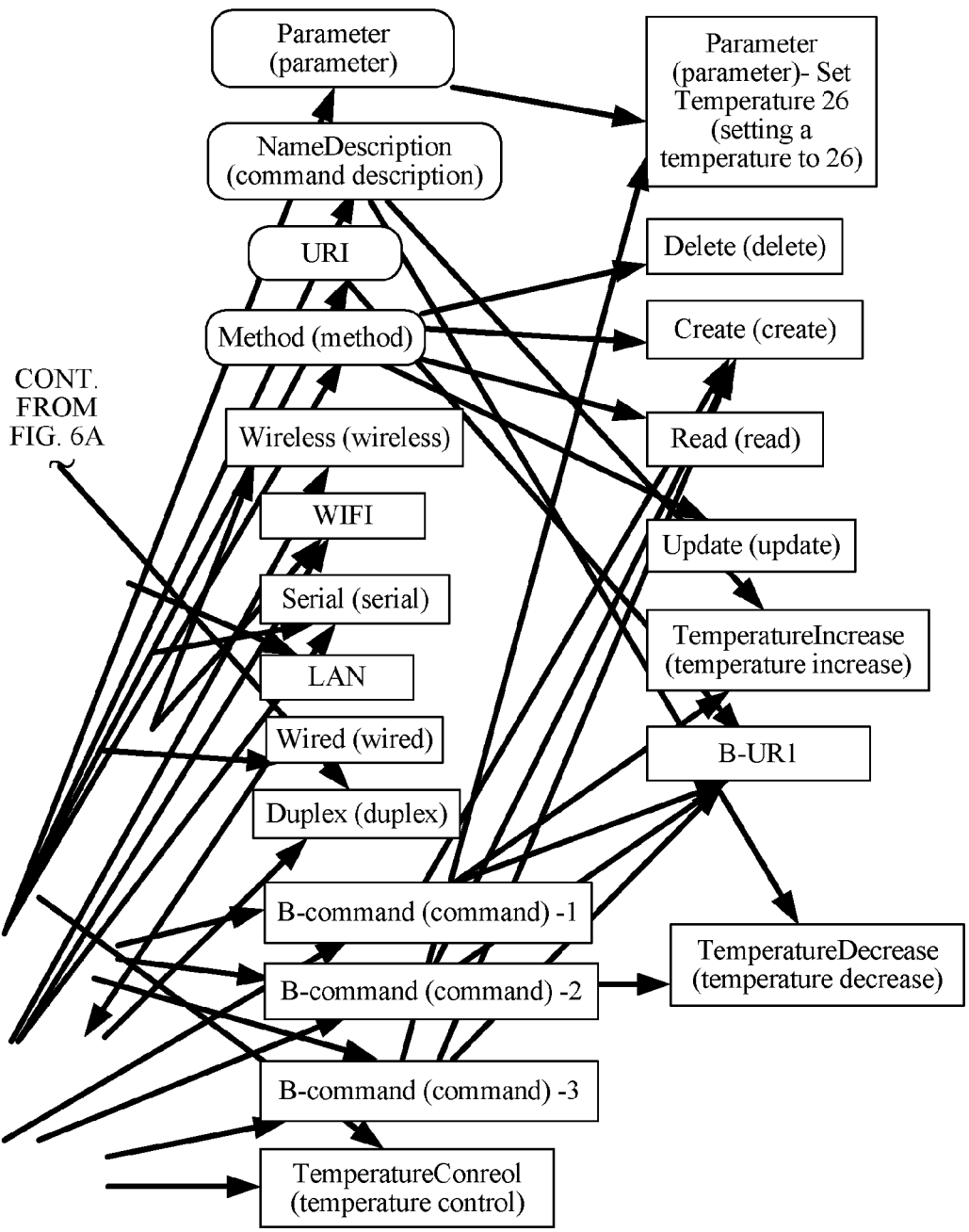

For example, in this embodiment of the present invention, it is assumed that an M2M device B is an air conditioner, and a filled capability model (also referred to as capability ontology) obtained according to capability information of the M2M device B may be shown in FIG. 6A and FIG. 6B. A capability (Capbility) in the capability model is divided into three types: a communication capability, a control capability, and a measurement capability. Each capability in the communication capability, the control capability, and the measurement capability includes multiple subentries. Subentries included in the communication capability are separately: a communication type subentry, a communication manner subentry, a communication range subentry, a communication medium subentry, and a communication protocol subentry. The measurement capability includes a measurement property (MeasurementPropery) subentry, and the measurement property subentry is a class (class) of a semantic sensor network (Semantic Sensor Network, SSN for short). An attribute "hasMeasurementProperty" defined in this embodiment of the present invention directs to the measurement property subentry from the measurement capability. This indicates that the measurement capability in this embodiment of the present invention is divided in a manner in which measurement capability of the SSN is divided. The control capability includes a control command subentry and a control type subentry, and each subentry may further include a next-level subentry. For example, each control command includes next-level subentries such as a command description (NameDescription) subentry, a method (Method) subentry, a URI subentry, and a parameter (Parameter) subentry. The method subentry indicates four operations: creation (Create), reading (Read), update (Update), and deletion (Delete) of a representational state transfer (Representational State Transfer, REST for short) interface. A capability of the M2M device B (B-Capbility) is connected to a general type: capability, and the capability of the M2M device B describes the general type: capability, indicating that the capability information of the M2M device B is filled. The capability of the M2M device B is divided into a communication capability of B (B-Communication-Capbility) and a control capability of B (B-ControlCapbility) that are respectively connected to two types: the communication capability and the control capability. The communication capability of B describes the communication capability type, and the control capability of B describes the control capability type, indicating that the M2M device B has a communication capability and a control capability. Both the control capability of B and the control type subentry are connected to a temperature control (TemperatureConteol) subentry, and the control capability of B describes the temperature control subentry of the control type subentry, indicating that the control capability of the M2M device B is a temperature control capability. The control capability of B and the control command subentry are separately connected to a command 1 of B (B-command-1), a command 2 of B (B-command-2), and a command 3 of B (B-command-3), and the command 1 of the B, the command 2 of the B, and the command 3 of B describe the control command subentry, indicating that the M2M device has three types of commands, which are respectively a command 1, a command 2, and a command 3. In addition, the command 1 of the B, the command 2 of the B, and the command 3 of B are separately connected to a next-level subentry: a create (Create) subentry, of a method subentry, and the command 1 of the B, the command 2 of the B, and the command 3 of B describe the create subentry, indicating that the M2M device can create the commands 1, 2, and 3. The command 1 of the B, the command 2 of the B, and the command 3 of the B, and the URI subentry are separately connected to a URI of B (B-URI), and the command 1 of the B, the command 2 of the B, and the command 3 of B describe the URI subentry, indicating that all the commands 1, 2, and 3 carry the B-URI. The command 1 of B is connected to a next-level subentry: a temperature increase (TemperatureIncrease) subentry, of the command description subentry, and the command 1 of B describes the temperature increase subentry, indicating that the command 1 is used to control increase of a temperature. The command 2 of B is connected to a next-level subentry: a temperature decrease (TemperatureDecrease) subentry, of the command description subentry, and the command 2 of B describes the temperature decrease subentry, indicating that the command 2 is used to control decrease of a temperature. The command 3 of B and the parameter subentry are separately connected to a subentry: a parameter: setting a temperature to 26 (Parameter-Set Temperature26), and the command 1 of B describes the parameter subentry, indicating that the command 3 is used to control a temperature parameter to be set to 26 degrees Celsius. The communication capability of B is connected to a next-level subentry: a serial (serial) subentry, of the communication type subentry, and the communication capability of B describes the serial subentry of the communication type subentry, indicating that the M2M device performs serial communications. The communication capability of B is connected to next-level subentries: a wired (Wired) subentry, a WIFI subentry, and a wireless subentry, of the communication medium subentry, and the communication capability of B describes the wired (Wired) subentry, the WIFI subentry, and the wireless subentry of the communication medium subentry, indicating that the M2M device may perform communication by using a wired medium, WIFI, and a wireless (wireless) medium. The communication capability of B is connected to a next-level subentry: a duplex (Duplex) subentry, of the communication manner subentry, and the communication capability of B describes the duplex subentry of the communication manner subentry, indicating that the M2M device performs communication in a duplex manner. The communication capability of B is connected to a next-level subentry: a Local Area Network (Local Area Network, LAN for short) subentry, of the communication range subentry, and the communication capability of B describes the LAN subentry of the communication range subentry, indicating that a communication range of the M2M device is a LAN. There are lines with arrows between different levels of types and/or subentries to indicate association between the types and/or subentries. For explanation of each type and each subentry, reference may be made to explanation of a capability model in FIG. 4. It should be noted that content in a conventional rectangular box in FIG. 6A and FIG. 6B represents an instance in the ontology, and content in a rectangular box with rounded corners (also referred to as an elliptic box) represents a class in the ontology.

Step 304: The M2M service platform updates an overall capability model according to the filled capability model.

Capability information of all registered M2M devices managed by the M2M service platform is recorded in the overall capability model in a type division manner of the capability model. The overall capability model may be obtained by combining multiple filled capability models, or may be obtained by combining multiple filled capability models after integration (for example, combining same subentries). This is not limited in this embodiment of the present invention. A subentry of each capability in a communication capability, a control capability, and a measurement capability in the overall capability model includes a type subentry and at least one data subentry. The type subentry is used to describe a semantic meaning of each capability, and the at least one data subentry is used to describe a practical meaning of each capability. For a specific division manner, reference may be made to FIG. 4, and details are not described in this embodiment of the present invention.

Step 305: The M2M device A sends a query condition to the M2M service platform by using the application program.

Step 306: The M2M service platform searches the overall capability model according to the query condition, and uses a device that meets the query condition as a to-be-queried device.

Figure 7:
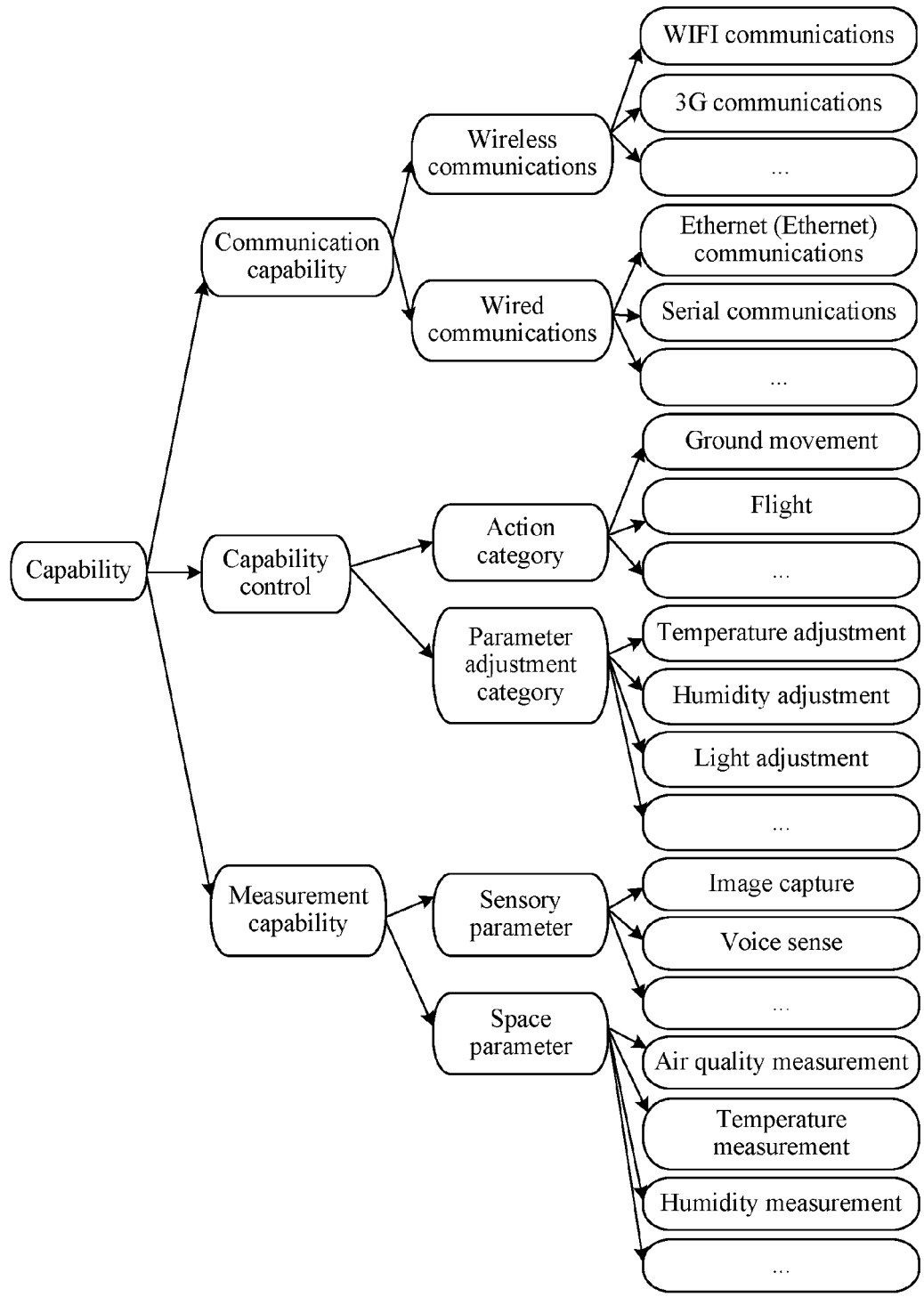
FIG. 7 is a schematic structural diagram of a capability field model according to an embodiment of the present invention.

It should be noted that in this embodiment of the present invention, a capability field model is established on the M2M service platform. The capability field model describes capability categories of all of a communication capability, a control capability, and a measurement capability, and the capability categories are generally all possible capability categories in the M2M data processing system. As shown in FIG. 7, FIG. 7 shows an example of a structure of a capability field model. FIG. 7 may be seen as a tree model in which a root is capabilities, branches are a communication capability, a control capability, and a measurement capability, leaves are capability categories. The model records all possible capability categories in the M2M data processing system.

A capability in the capability field model is divided into three types: a communication capability, a control capability, and a measurement capability. The communication capability is divided into two categories: a wireless communications category and a wired communications category. The wireless communications is divided into a WIFI communications category, a 3G communications category, and the like. The wired communications is divided into an Ethernet (Ethernet) communications category, a serial communications category, and the like. The control capability is divided into two categories: an action category and an adjustment parameter category. The action category is divided into a ground movement category and a flight category. The adjustment parameter category is divided into a temperature adjustment category, a humidity adjustment category, a light adjustment category, and the like. The measurement capability is divided into two categories: a sensory parameter category and a space parameter category. The sensory parameter category is divided into an image capture category, a voice sense category, and the like. The space parameter is divided into an air quality measurement category, a temperature measurement category, a humidity measurement category, and the like. A described type subentry of a subentry of each capability in the overall capability model is associated with a capability category of a corresponding capability in the capability field model. For example, the temperature adjustment category in FIG. 7 is associated with a described control type subentry: the temperature control subentry in FIG. 6B; and the wired communication category or the serial communication category in FIG. 7 is associated with a described communication type subentry: the serial subentry in FIG. 6B.

Figure 8:
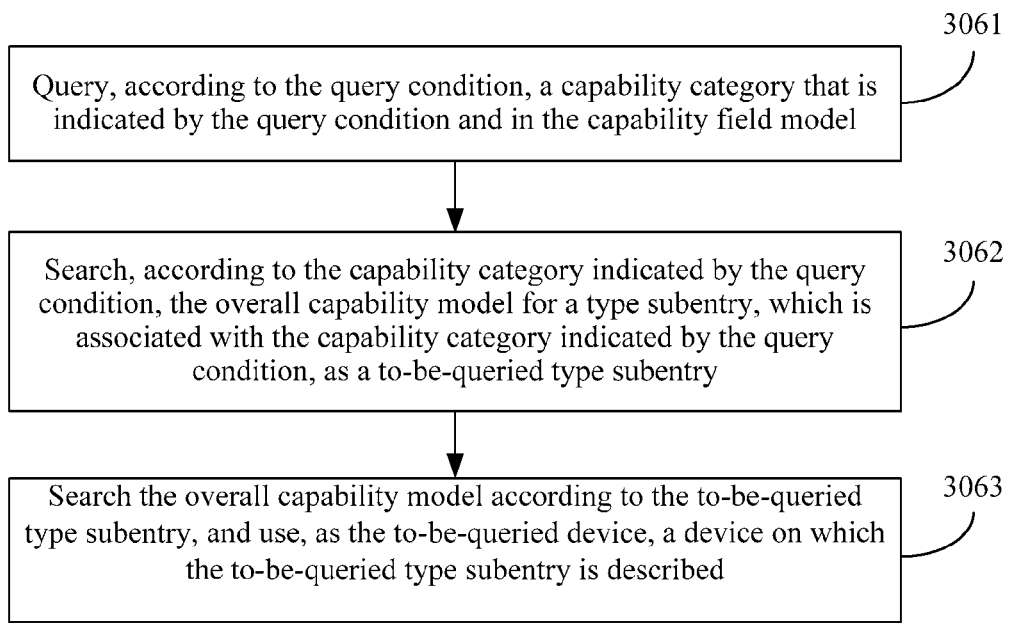
FIG. 8 is a flowchart of a method for determining a to-be-queried device according to an embodiment of the present invention.

The foregoing query condition may include a capability category, such as the serial communication category and the temperature adjustment category, of at least one of the communication capability, the control capability, or the measurement capability. As shown in FIG. 8, a process of determining the to-be-queried device may include the following steps.

Step 3061: Query, according to the query condition, a capability category that is in the capability field model and indicated by the query condition.

For example, if the query condition includes the temperature adjustment category, it indicates that the M2M device A expects to search for all M2M devices that can adjust a temperature. Because all possible capability categories in the M2M data processing system are recorded in the capability field model, the capability field model may be searched level by level according to the capability category in the query condition, till the capability category indicated by the query condition is found.

Step 3062: Search, according to the capability category indicated by the query condition, the overall capability model for a type subentry that is associated with the capability category indicated by the query condition, and use the type subentry as a to-be-queried type subentry.

Because a described type subentry of a subentry of each capability in the overall capability model is associated with a capability category of a corresponding capability in the capability field model, the overall capability model may be searched according to the capability category indicated by the query condition for the type subentry that is associated with the capability category indicated by the query condition, and the type subentry is used as the to-be-queried type subentry. For example, the temperature control subentry shown in FIG. 6B may be found according to the described control type subentry associated with the temperature adjustment category.

Step 3063: Search the overall capability model according to the to-be-queried type subentry, and use, as the to-be-queried device, a device on which the to-be-queried type subentry is described.

For example, it can be determined, according to the temperature control subentry shown in FIG. 6B, that an M2M device on which the temperature control subentry is described is the M2M device B. Particularly, because capability information of multiple M2M devices is recorded in the overall capability model, multiple M2M devices may be used as to-be-queried devices according to the query condition. In this embodiment of the present invention, it is assumed that the to-be-queried devices are the M2M device B and an M2M device C.

Step 307: The M2M service platform sends an identifier of the to-be-queried device to the application program of the M2M device A.

That is, The M2M service platform sends identifiers of the M2M device B and the M2M device C to the application program of the M2M device A.

Step 308: The M2M device A selects a target M2M device from the device corresponding to the identifier of the to-be-queried device.

The M2M device A may select the target M2M device from the device corresponding to the identifier of the to-be-queried device. For example, the target M2M device may be randomly selected, or be screened according to a newly set capability category. In this embodiment of the present invention, it is assumed that the target M2M device finally obtained by means of screening is the M2M device B.

Step 309: The M2M device A sends control information to the M2M service platform, where the control information includes an identifier of the target M2M device and an instruction parameter.

The control information instructs the target M2M device to execute a corresponding action according to the instruction parameter. For example, the instruction parameter is Parameter(parameter)-Set Temperature26 (setting a temperature to 26), that is, the target M2M device adjusts a temperature to 26 degrees Celsius.

Step 310: The M2M service platform queries at least one data subentry in a control capability in the overall capability model according to the identifier of the target M2M device to obtain a control command corresponding to the target M2M device.

The data subentry in the control capability in the overall capability model describes control commands corresponding to all the registered M2M devices. Therefore, the M2M service platform queries the at least one data subentry in the control capability in the overall capability model according to the identifier of the target M2M device to obtain the control command corresponding to the target M2M device. For example, the M2M service platform queries the at least one data subentry in the control capability in the overall capability model according to an identifier of the M2M device B. The overall capability model includes the filled capability model shown in FIG. 6A and FIG. 6B, so that obtained control commands corresponding to the target M2M device are separately the command 1 of B (B-command-1), the command 2 of B (B-command-2), and the command 3 of B (B-command-3).

Step 311: Generate a target control command according to the instruction parameter and the control command.

When the instruction parameter is the Parameter(Parameter)-Set Temperature26 (setting a temperature to 26). It can be learnt from FIG. 6A and FIG. 6B that the instruction parameter is corresponding to the command 3 of B (B-command-3). Therefore, the generated target control command is the "B-command-3".

Step 312: The M2M service platform sends the target control command to the target M2M device according to the identifier of the target M2M device.

Step 313: The target M2M device performs an action instructed by the target control command and generates feedback data.

For example, the target M2M device adjusts the temperature to 26 degrees Celsius according to the target control command "B-command-3", and the feedback data indicates that the temperature has been adjusted to 26 degrees Celsius.

Step 314. The target M2M device sends the feedback data to the M2M service platform.

Step 315. The M2M service platform sends the feedback data to the M2M device.

Particularly, the M2M data processing system further includes an M2M device on which no application program is installed. The M2M device generally does not have a query function and a control function and may perform a related action such as temperature adjustment and humidity measurement under the control of an M2M device on which an application program is installed. Another function of the M2M device is the same as that of the M2M device on which an application program is installed. Therefore, for a specific action of the M2M device on which no application program is installed, reference may be made to a related action of the M2M device A in steps 301 to 304 and an action of the target M2M device in steps 313 to 314, and details are not described in this embodiment of the present invention.

It should be noted that a sequence of the steps of the M2M data processing method provided in the embodiments of the present invention may be properly adjusted, and the steps may also be correspondingly added or deleted according to a situation. Any variation readily figured out by a person skilled in the art within the technical scope disclosed in the present invention shall fall within the protection scope of the present invention, and details are not described herein again.

In conclusion, according to the M2M data processing method provided in this embodiment of the present invention, a capability model includes three types of capabilities: a communication capability, a control capability, and a measurement capability, and each capability is divided into multiple subentries according to a preset rule. Therefore, a filled capability model obtained according to the capability model and capability information of an M2M device is also divided in a type division manner of the capability model; and an overall capability model updated by using the filled capability model is also divided in the type division manner of the capability model. In this case, a query may be performed by the type without massive data queries. Therefore, a query latency and waste of hardware resources of an M2M service platform are reduced.

Figure 9:
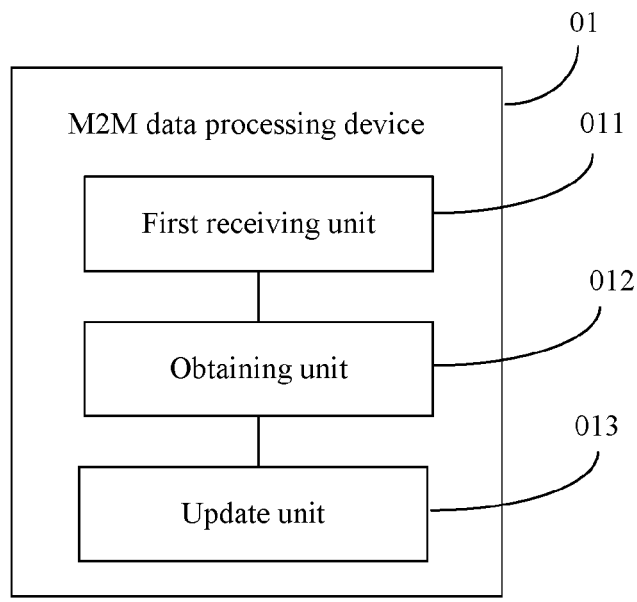
FIG. 9 is a schematic structural diagram of an M2M data processing device according to an example of an embodiment of the present invention.

An example of an embodiment of the present invention provides an M2M data processing device 01 applied to an M2M service platform. As shown in FIG. 9, the M2M data processing device 01 includes: a first receiving unit 011, an obtaining unit 012, and an update unit 013.

The first receiving unit 011 is configured to receive a registration request sent by an M2M device.

The obtaining unit 012 is configured to obtain a filled capability model according to a capability model and capability information of the M2M device after authentication on the registration request succeeds, where the capability model includes three types of capabilities: a communication capability, a control capability, and a measurement capability, each capability is divided into multiple subentries according to a preset rule, and the filled capability model describes at least one subentry corresponding to a communication capability, a control capability, and a measurement capability of the M2M device.

The update unit 013 is configured to update an overall capability model according to the filled capability model, where capability information of all registered M2M devices managed by the M2M service platform is recorded in the overall capability model in a type division manner of the capability model.

In conclusion, according to the M2M data processing device provided in this embodiment of the present invention, a capability model includes three types of capabilities: a communication capability, a control capability, and a measurement capability, and each capability is divided into multiple subentries according to a preset rule. Therefore, a filled capability model obtained by an obtaining unit according to the capability model and capability information of an M2M device is also divided in a type division manner of the capability model; and an overall capability model updated by an update unit by using the filled capability model is also divided in the type division manner of the capability model. In this case, a query may be performed by the type without massive data queries. Therefore, a query latency and waste of hardware resources of an M2M service platform are reduced.

Figure 10:
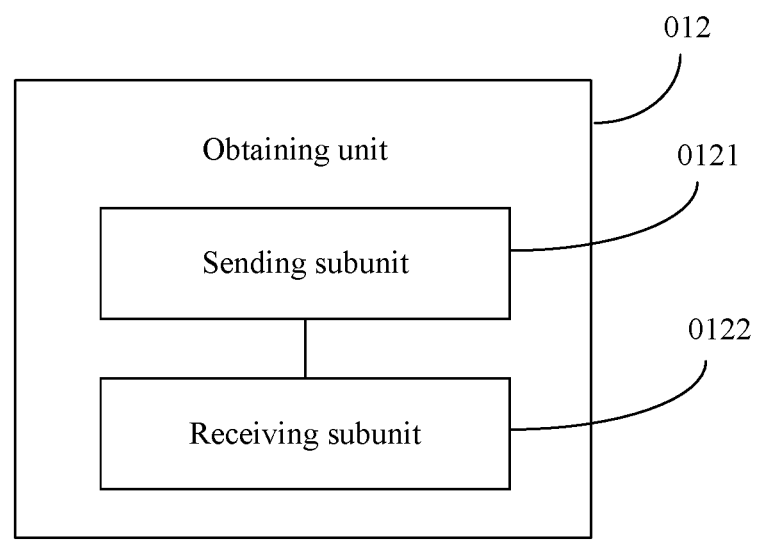
FIG. 10 is a schematic structural diagram of an obtaining unit according to an example of an embodiment of the present invention.

In one aspect, as shown in FIG. 10, the obtaining unit 012 includes:

a sending subunit 0121, configured to send the capability model to the M2M device, so that the M2M device fills the capability model according to the capability information of the M2M device to obtain the filled capability model; and a receiving subunit 0122, configured to receive the filled capability model sent by the M2M device.

The registration request includes a model filling capability identifier, and the model filling capability identifier is used to indicate whether the M2M device has a model filling capability. The sending subunit 0121 is specifically configured to: determine, according to the model filling capability identifier, whether the M2M device has the model filling capability; and send the capability model to the M2M device if the M2M device has the model filling capability.

Figure 11:
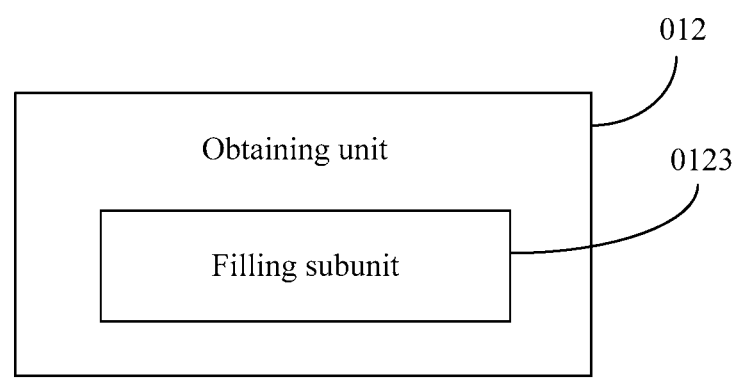
FIG. 11 is a schematic structural diagram of another obtaining unit according to an example of an embodiment of the present invention.

In another aspect, as shown in FIG. 11, the registration request includes the capability information of the M2M device; and the obtaining unit 012 includes:

a filling subunit 0123, configured to fill the capability model with the capability information of the M2M device to obtain the filled capability model.

Figure 12:
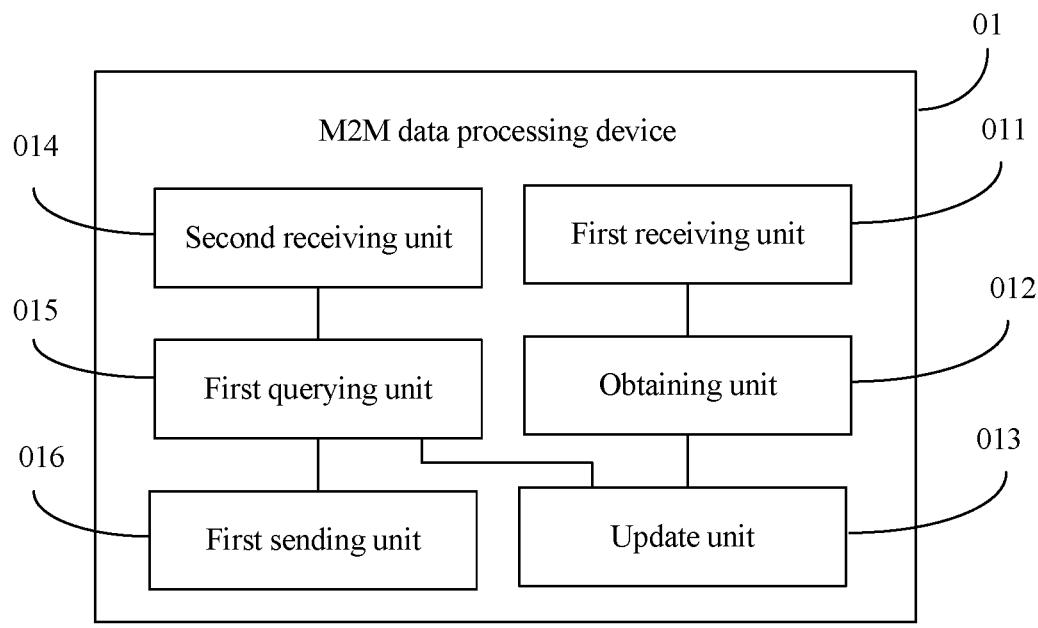
FIG. 12 is a schematic structural diagram of another M2M data processing device according to an example of an embodiment of the present invention.

An example of an embodiment of the present invention provides another M2M data processing device 01 applied to an M2M service platform. As shown in FIG. 12, the M2M data processing device 01 includes: a first receiving unit 011, an obtaining unit 012, an update unit 013, a second receiving unit 014, a first querying unit 015, and a first sending unit 016.

The first receiving unit 011 is configured to receive a registration request sent by an M2M device.

The obtaining unit 012 is configured to obtain a filled capability model according to a capability model and capability information of the M2M device after authentication on the registration request succeeds, where the capability model includes three types of capabilities: a communication capability, a control capability, and a measurement capability, each capability is divided into multiple subentries according to a preset rule, and the filled capability model describes at least one subentry corresponding to a communication capability, a control capability, and a measurement capability of the M2M device.

The update unit 013 is configured to update an overall capability model according to the filled capability model, where capability information of all registered M2M devices managed by the M2M service platform is recorded in the overall capability model in a type division manner of the capability model.

The second receiving unit 014 is configured to receive a query condition sent by an application program, where the application program is installed on the M2M device.

The first querying unit 015 is configured to search the overall capability model according to the query condition, and use a device that meets the query condition as a to-be-queried device.

The first sending unit 016 is configured to send an identifier of the to-be-queried device to the application program of the M2M device.

A subentry of each capability in a communication capability, a control capability, and a measurement capability in the overall capability model includes a type subentry and at least one data subentry. The type subentry is used to describe a semantic meaning of each capability, and the at least one data subentry is used to describe a practical meaning of each capability. A capability field model is established on the M2M service platform, and the capability field model describes a capability category of each capability in the communication capability, the control capability, and the measurement capability. A described type subentry of a subentry of each capability in the overall capability model is associated with a capability category of a corresponding capability in the capability field model. The query condition includes a capability category of at least one capability in the communication capability, the control capability, and the measurement capability.

Figure 13:
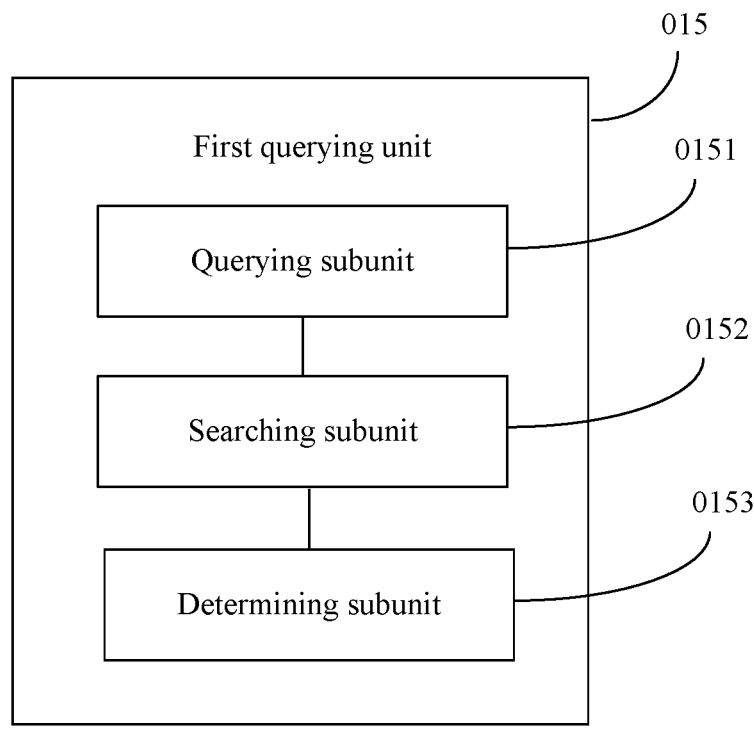
FIG. 13 is a schematic structural diagram of a first querying unit according to an example of an embodiment of the present invention.

As shown in FIG. 13, the first querying unit 015 includes: a querying subunit 0151, a searching subunit 0152, and a determining subunit 0153.

The querying subunit 0151 is configured to query, according to the query condition, a capability category that is in the capability field model and indicated by the query condition.

The searching subunit 0152 is configured to search, according to the capability category indicated by the query condition, the overall capability model for a type subentry that is associated with the capability category indicated by the query condition, and use the type subentry as a to-be-queried type subentry.

The determining subunit 0153 is configured to search the overall capability model according to the to-be-queried type subentry, and use, as the to-be-queried device, a device on which the to-be-queried type subentry is described.

Figure 14:
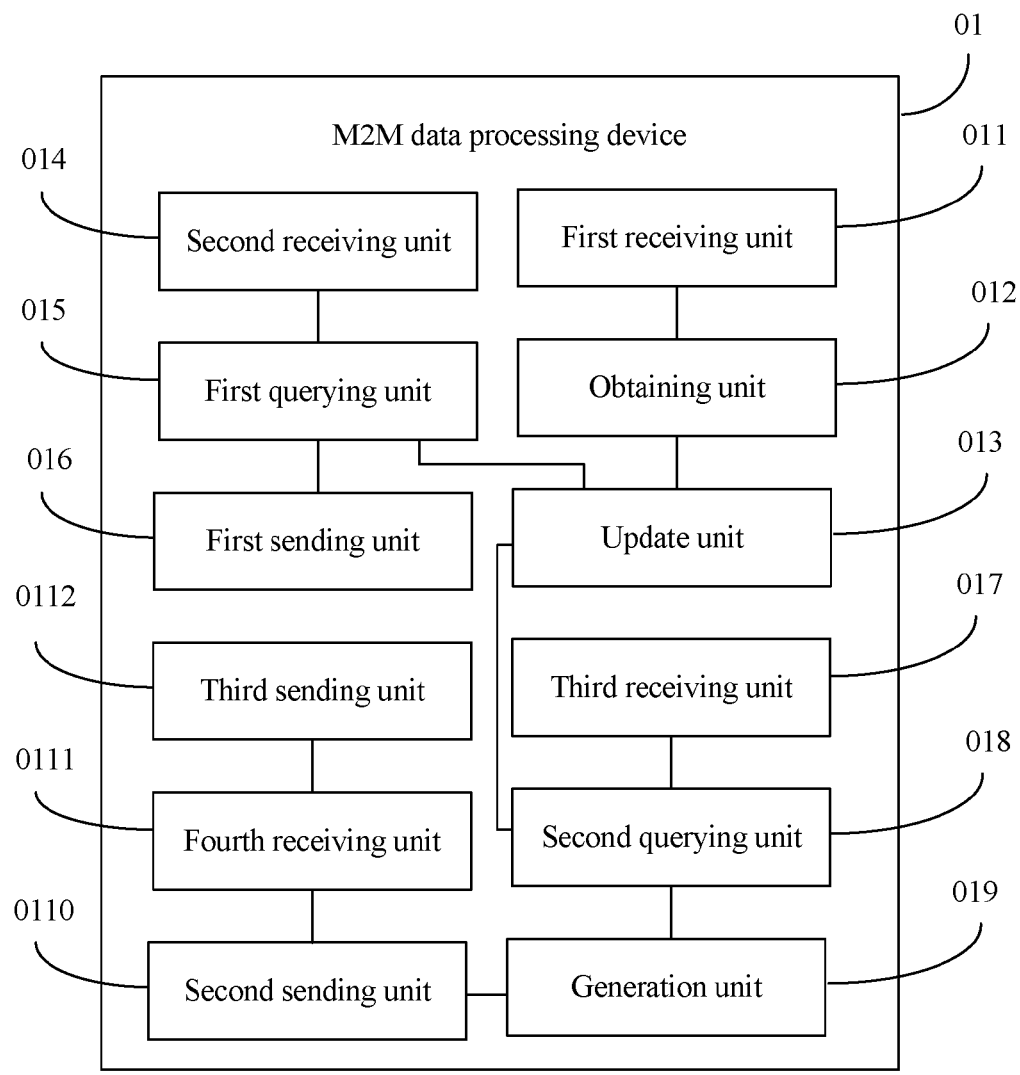
FIG. 14 is a schematic structural diagram of still another M2M data processing device according to an example of an embodiment of the present invention.

An example of an embodiment of the present invention provides still another M2M data processing device 01 applied to an M2M service platform, and a data subentry in a control capability in an overall capability model describes control commands corresponding to all registered M2M devices. As shown in FIG. 14, the M2M data processing device 01 includes: a first receiving unit 011, an obtaining unit 012, an update unit 013, a second receiving unit 014, a first querying unit 015, a first sending unit 016, a third receiving unit 017, a second querying unit 018, a generation unit 019, a second sending unit 0110, a fourth receiving unit 0111, and a third sending unit 0112.

The first receiving unit 011 is configured to receive a registration request sent by an M2M device.

The obtaining unit 012 is configured to obtain a filled capability model according to a capability model and capability information of the M2M device after authentication on the registration request succeeds, where the capability model includes three types of capabilities: a communication capability, a control capability, and a measurement capability, each capability is divided into multiple subentries according to a preset rule, and the filled capability model describes at least one subentry corresponding to a communication capability, a control capability, and a measurement capability of the M2M device.

The update unit 013 is configured to update an overall capability model according to the filled capability model, where capability information of all registered M2M devices managed by the M2M service platform is recorded in the overall capability model in a type division manner of the capability model.

The second receiving unit 014 is configured to receive a query condition sent by an application program, where the application program is installed on the M2M device.

The first querying unit 015 is configured to search the overall capability model according to the query condition, and use a device that meets the query condition as a to-be-queried device.

The first sending unit 016 is configured to send an identifier of the to-be-queried device to the application program of the M2M device.

The third receiving unit 017 is configured to receive control information sent by the application program, where the control information includes an identifier of the target M2M device and an instruction parameter, and the target M2M device is selected by the application program from the device corresponding to the identifier of the to-be-queried device.

The second querying unit 018 is configured to query at least one data subentry in the control capability in the overall capability model according to the identifier of the target M2M device to obtain a control command corresponding to the target M2M device.

The generation unit 019 is configured to generate a target control command according to the instruction parameter and the control command.

The second sending unit 0110 is configured to send the target control command to the target M2M device according to the identifier of the target M2M device, so that the target M2M device performs an action instructed by the target control command and generates feedback data.

The fourth receiving unit 0111 is configured to receive the feedback data sent by the target M2M device.

The third sending unit 0112 is configured to send the feedback data to the application program.

A type subentry of the communication capability in the overall capability model is a communication type subentry, and at least one data subentry of the communication capability in the overall capability model includes: a communication medium subentry, a communication range subentry, a communication manner subentry, and a communication protocol subentry. A type subentry of the control capability in the overall capability model is a control type subentry, a data subentry of the control capability in the overall capability model describes the control commands corresponding to all the registered M2M devices, and each control command includes next-level subentries such as a command description subentry, a device subentry, a uniform resource identifier URI subentry, and a parameter subentry.

In conclusion, according to the M2M data processing device provided in this embodiment of the present invention, a capability model includes three types of capabilities: a communication capability, a control capability, and a measurement capability, and each capability is divided into multiple subentries according to a preset rule. Therefore, a filled capability model obtained by an obtaining unit according to the capability model and capability information of an M2M device is also divided in a type division manner of the capability model; and an overall capability model updated by an update unit by using the filled capability model is also divided in the type division manner of the capability model. In this case, a query may be performed by the type without massive data queries. Therefore, a query latency and waste of hardware resources of an M2M service platform are reduced.

Figure 15:
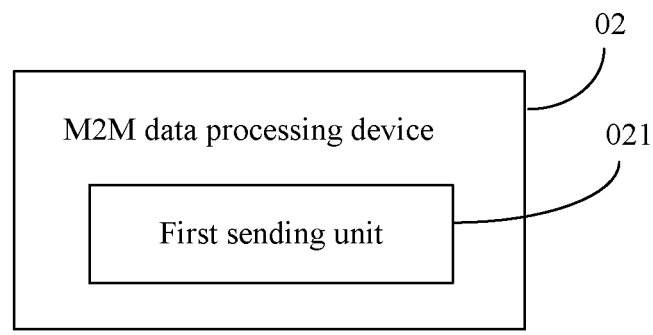
FIG. 15 is a schematic structural diagram of an M2M data processing device according to another example of an embodiment of the present invention.

Another example of an embodiment of the present invention provides an M2M data processing device 02 applied to an M2M device. As shown in FIG. 15, the M2M data processing device 02 includes a first sending unit 021.

The first sending unit 021 is configured to send a registration request to an M2M service platform, so that the M2M service platform obtains a filled capability model according to a capability model and capability information of the M2M device after authentication on the registration request succeeds, and updates an overall capability model according to the filled capability model.

The capability model includes three types of capabilities: a communication capability, a control capability, and a measurement capability, and each capability is divided into multiple subentries according to a preset rule; the filled capability model describes at least one subentry corresponding to a communication capability, a control capability, and a measurement capability of the M2M device; and capability information of all registered M2M devices managed by the M2M service platform is recorded in the overall capability model in a type division manner of the capability model.

In conclusion, according to the M2M data processing method provided in this embodiment of the present invention, a capability model includes three types of capabilities: a communication capability, a control capability, and a measurement capability, and each capability is divided into multiple subentries according to a preset rule. Therefore, a filled capability model obtained according to the capability model and capability information of an M2M device is also divided in a type division manner of the capability model; and an overall capability model updated by using the filled capability model is also divided in the type division manner of the capability model. In this case, a query may be performed by the type without massive data queries. Therefore, a query latency and waste of hardware resources of an M2M service platform are reduced.

Figure 16:
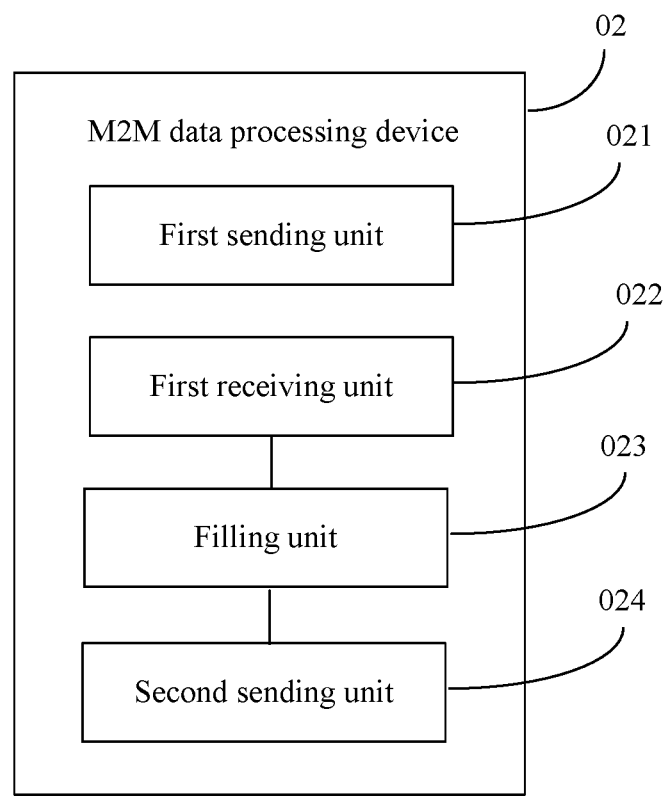
FIG. 16 is a schematic structural diagram of another M2M data processing device according to another example of an embodiment of the present invention.

Another example of an embodiment of the present invention provides another M2M data processing device 02 applied to an M2M device. As shown in FIG. 16, the M2M data processing device 02 including: a first sending unit 021, a first receiving unit 022, a filling unit 023, and a second sending unit 024.

The first sending unit 021 is configured to send a registration request to an M2M service platform, so that the M2M service platform obtains a filled capability model according to a capability model and capability information of the M2M device after authentication on the registration request succeeds, and updates an overall capability model according to the filled capability model.

The capability model includes three types of capabilities: a communication capability, a control capability, and a measurement capability, and each capability is divided into multiple subentries according to a preset rule; the filled capability model describes at least one subentry corresponding to a communication capability, a control capability, and a measurement capability of the M2M device; and capability information of all registered M2M devices managed by the M2M service platform is recorded in the overall capability model in a type division manner of the capability model.

The first receiving unit 022 is configured to receive the capability model sent by the M2M service platform.

The filling unit 023 is configured to fill the capability model according to the capability information of the M2M device to obtain the filled capability model.

The second sending unit 024 is configured to send the filled capability model to the M2M service platform.

Particularly, the registration request may include a model filling capability identifier, and the model filling capability identifier is used to indicate whether the M2M device has a model filling capability. The registration request may further include the capability information of the M2M device.

Figure 17:
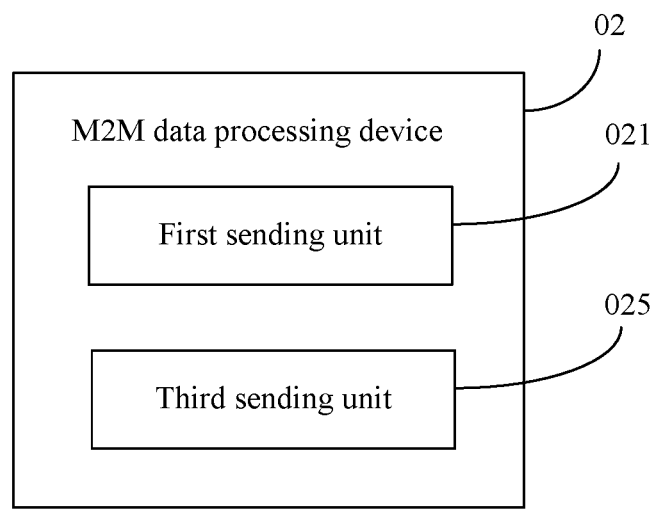
FIG. 17 is a schematic structural diagram of still another M2M data processing device according to another example of an embodiment of the present invention.

Further, an application program may be installed on the M2M device. Another example of an embodiment of the present invention provides still another M2M data processing device 02 applied to an M2M device. As shown in FIG. 17, the M2M data processing device 02 includes: a first sending unit 021 and a third sending unit 025.

The first sending unit 021 is configured to send a registration request to an M2M service platform, so that the M2M service platform obtains a filled capability model according to a capability model and capability information of the M2M device after authentication on the registration request succeeds, and updates an overall capability model according to the filled capability model.

The capability model includes three types of capabilities: a communication capability, a control capability, and a measurement capability, and each capability is divided into multiple subentries according to a preset rule; the filled capability model describes at least one subentry corresponding to a communication capability, a control capability, and a measurement capability of the M2M device; and capability information of all registered M2M devices managed by the M2M service platform is recorded in the overall capability model in a type division manner of the capability model.

The third sending unit 025 is configured to send a query condition to the M2M service platform by using the application program, so that the M2M service platform searches the overall capability model according to the query condition, uses a device that meets the query condition as a to-be-queried device, and sends an identifier of the to-be-queried device to the application program.

It should be noted that a subentry of each capability in a communication capability, a control capability, and a measurement capability in the overall capability model includes a type subentry and at least one data subentry. The type subentry is used to describe a semantic meaning of each capability, and the at least one data subentry is used to describe a practical meaning of each capability. A capability field model is established on the M2M service platform, and the capability field model describes a capability category of each capability in the communication capability, the control capability, and the measurement capability. A described type subentry of a subentry of each capability in the overall capability model is associated with a capability category of a corresponding capability in the capability field model. The query condition includes a capability category of at least one capability in the communication capability, the control capability, and the measurement capability.

Figure 18:
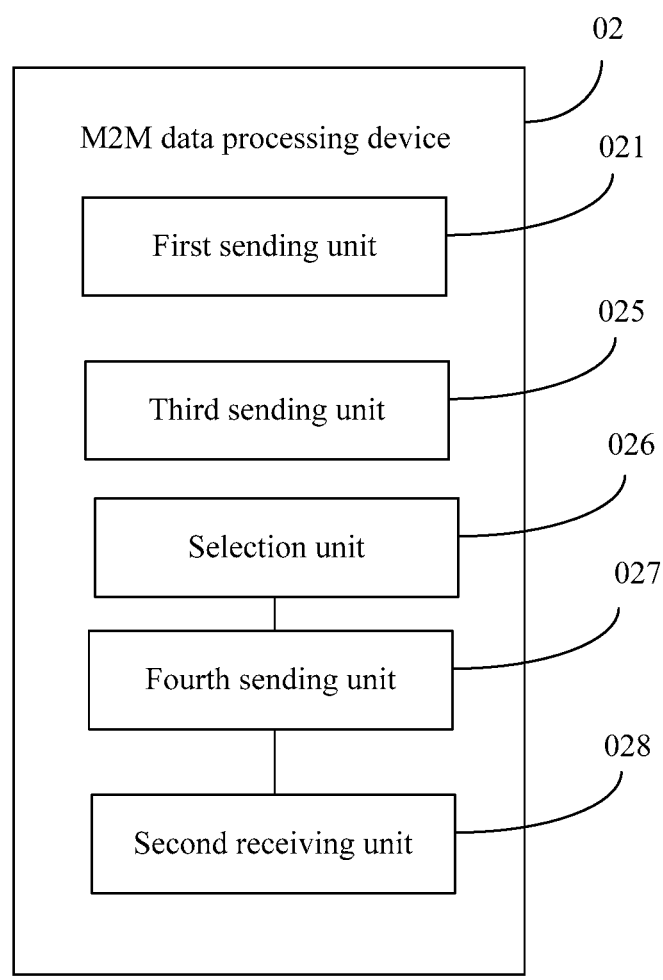
FIG. 18 is a schematic structural diagram of yet another M2M data processing device according to another example of an embodiment of the present invention.

Another example of an embodiment of the present invention provides still another M2M data processing device 02 applied to an M2M device, and a data subentry in a control capability in an overall capability model describes control commands corresponding to all registered M2M devices. As shown in FIG. 18, the M2M data processing device 02 includes: a first sending unit 021, a third sending unit 025, a selection unit 026, a fourth sending unit 027, and a second receiving unit 028.

The first sending unit 021 is configured to send a registration request to an M2M service platform, so that the M2M service platform obtains a filled capability model according to a capability model and capability information of the M2M device after authentication on the registration request succeeds, and updates the overall capability model according to the filled capability model.

The capability model includes three types of capabilities: a communication capability, a control capability, and a measurement capability, and each capability is divided into multiple subentries according to a preset rule; the filled capability model describes at least one subentry corresponding to a communication capability, a control capability, and a measurement capability of the M2M device; and capability information of all registered M2M devices managed by the M2M service platform is recorded in the overall capability model in a type division manner of the capability model.

The third sending unit 025 is configured to send a query condition to the M2M service platform by using the application program, so that the M2M service platform searches the overall capability model according to the query condition, uses a device that meets the query condition as a to-be-queried device, and sends an identifier of the to-be-queried device to the application program.

The selection unit 026 is configured to select a target M2M device from the device corresponding to the identifier of the to-be-queried device.

The fourth sending unit 027 is configured to send control information to the M2M service platform, where the control information includes an identifier of the target M2M device and an instruction parameter, so that the M2M service platform queries at least one data subentry in the control capability in the overall capability model according to the identifier of the target M2M device to obtain a control command corresponding to the target M2M device, generates a target control command according to the instruction parameter and the control command, and sends the target control command to the target M2M device according to the identifier of the target M2M device.

The second receiving unit 028 is configured to receive feedback data sent by the M2M service platform, where after the target M2M device performs an action instructed by the target control command, the feedback data is generated and sent to the M2M service platform.

For example, a type subentry of the communication capability in the overall capability model is a communication type subentry, and at least one data subentry of the communication capability in the overall capability model includes: a communication medium subentry, a communication range subentry, a communication manner subentry, and a communication protocol subentry. A type subentry of the control capability in the overall capability model is a control type subentry, the data subentry of the control capability in the overall capability model describes the control commands corresponding to all the registered M2M devices, and each control command includes next-level subentries such as a command description subentry, a device subentry, a URI subentry, and a parameter subentry.

In conclusion, according to the M2M data processing method provided in this embodiment of the present invention, a capability model includes three types of capabilities: a communication capability, a control capability, and a measurement capability, and each capability is divided into multiple subentries according to a preset rule. Therefore, a filled capability model obtained according to the capability model and capability information of an M2M device is also divided in a type division manner of the capability model; and an overall capability model updated by using the filled capability model is also divided in the type division manner of the capability model. In this case, a query may be performed by the type without massive data queries. Therefore, a query latency and waste of hardware resources of an M2M service platform are reduced.

An embodiment of the present invention provides an M2M data processing system. For a specific structure, reference may be made to FIG. 1, and the M2M data processing system includes: an M2M service platform and an M2M device.

The M2M service platform includes the M2M data processing device shown in any one of FIG. 9, FIG. 12, or FIG. 14 in the embodiments of the present invention.

The M2M device includes the M2M data processing device shown in any one of FIG. 15 to FIG. 18 in the embodiments of the present invention.

Figure 19:
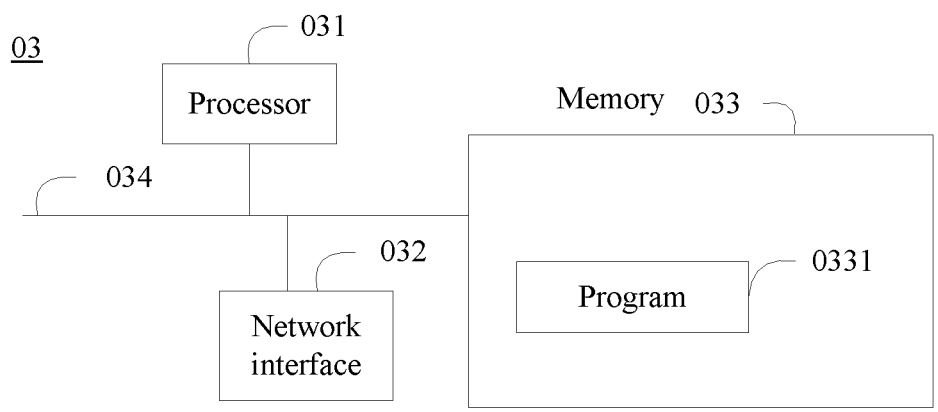
FIG. 19 is a schematic structural diagram of an M2M data processing device according to still another example of an embodiment of the present invention.

Still another example of an embodiment of the present invention provides an M2M data processing device 03 applied to an M2M service platform. As shown in FIG. 19, the M2M data processing device 03 includes: at least one processor 031, at least one network interface 032 or another communications interface, a memory 033, and at least one communications bus 034. For example, the processor 031 may be a central processing unit (Central processing unit, CPU for short), and the communications bus 034 is configured to implement connections and communication between these devices. The processor 031 is configured to execute an executable module stored in the memory 033, such as a computer program. The memory 033 may include a high-speed random access memory (Random Access Memory, RAM for short), or may include a non-volatile memory (non-volatile memory), for example, at least one disk memory. A connection between the M2M service platform and the M2M device is implemented by using the at least one network interface 032.

In some implementation manners, the memory 033 stores a program 0331, and the program 0331 may be executed by the processor 031, and the program 0331 may include:

receiving a registration request sent by an M2M device;

obtaining a filled capability model according to a capability model and capability information of the M2M device after authentication on the registration request succeeds, where the capability model includes three types of capabilities: a communication capability, a control capability, and a measurement capability, each capability is divided into multiple subentries according to a preset rule, and the filled capability model describes at least one subentry corresponding to a communication capability, a control capability, and a measurement capability of the M2M device; and updating an overall capability model according to the filled capability model, where capability information of all registered M2M devices managed by the M2M service platform is recorded in the overall capability model in a type division manner of the capability model.

Optionally, the obtaining a filled capability model according to a capability model and capability information of the M2M device includes:

sending the capability model to the M2M device, so that the M2M device fills the capability model according to the capability information of the M2M device to obtain the filled capability model; and receiving the filled capability model sent by the M2M device.

Optionally, the registration request includes a model filling capability identifier, and the model filling capability identifier is used to indicate whether the M2M device has a model filling capability.

The sending the capability model to the M2M device includes:

determining, according to the model filling capability identifier, whether the M2M device has the model filling capability; and sending the capability model to the M2M device if the M2M device has the model filling capability.

Optionally, the registration request includes the capability information of the M2M device; and the obtaining a filled capability model according to a capability model and capability information of the M2M device includes:

filling, by the M2M service platform, the capability model with the capability information of the M2M device to obtain the filled capability model.

Optionally, after the updating an overall capability model according to the filled capability model, the program 0331 stored in the memory 033 further includes:

receiving a query condition sent by an application program, where the application program is installed on the M2M device;

searching the overall capability model according to the query condition, and using a device that meets the query condition as a to-be-queried device; and sending an identifier of the to-be-queried device to the application program of the M2M device.

Optionally, a subentry of each capability in a communication capability, a control capability, and a measurement capability in the overall capability model includes a type subentry and at least one data subentry. The type subentry is used to describe a semantic meaning of each capability, and the at least one data subentry is used to describe a practical meaning of each capability. A capability field model is established on the M2M service platform, and the capability field model describes a capability category of each capability in the communication capability, the control capability, and the measurement capability. A described type subentry of a subentry of each capability in the overall capability model is associated with a capability category of a corresponding capability in the capability field model. The query condition includes a capability category of at least one capability in the communication capability, the control capability, and the measurement capability.

The searching the overall capability model according to the query condition, and using a device that meets the query condition as a to-be-queried device includes:

querying, according to the query condition, a capability category that is in the capability field model and indicated by the query condition;

searching, according to the capability category indicated by the query condition, the overall capability model for a type subentry that is associated with the capability category indicated by the query condition, and using the type subentry as a to-be-queried type subentry; and searching the overall capability model according to the to-be-queried type subentry, and using, as the to-be-queried device, a device on which the to-be-queried type subentry is described.

Optionally, a data subentry in the control capability in the overall capability model describes control commands corresponding to all the registered M2M devices, and after the sending an identifier of the to-be-queried device to the application program, the program 0331 stored in the memory 033 further includes:

receiving control information sent by the application program, where the control information includes an identifier of the target M2M device and an instruction parameter, and the target M2M device is selected by the application program from the device corresponding to the identifier of the to-be-queried device;

querying the at least one data subentry in the control capability in the overall capability model according to the identifier of the target M2M device to obtain a control command corresponding to the target M2M device;

generating a target control command according to the instruction parameter and the control command;

sending the target control command to the target M2M device according to the identifier of the target M2M device, so that the target M2M device performs an action instructed by the target control command and generates feedback data;

receiving the feedback data sent by the target M2M device; and sending the feedback data to the application program.

Optionally, a type subentry of the communication capability in the overall capability model is a communication type subentry, and at least one data subentry of the communication capability in the overall capability model includes: a communication medium subentry, a communication range subentry, a communication manner subentry, and a communication protocol subentry; and a type subentry of the control capability in the overall capability model is a control type subentry, a data subentry of the control capability in the overall capability model describes control commands corresponding to all the registered M2M devices, and each control command includes next-level subentries such as a command description subentry, a device subentry, a universal resource identifier URI subentry, and a parameter subentry.

In conclusion, according to the M2M data processing method provided in this embodiment of the present invention, a capability model includes three types of capabilities: a communication capability, a control capability, and a measurement capability, and each capability is divided into multiple subentries according to a preset rule. Therefore, a filled capability model obtained according to the capability model and capability information of an M2M device is also divided in a type division manner of the capability model; and an overall capability model updated by using the filled capability model is also divided in the type division manner of the capability model. In this case, a query may be performed by the type without massive data queries. Therefore, a query latency and waste of hardware resources of an M2M service platform are reduced.

Figure 20:
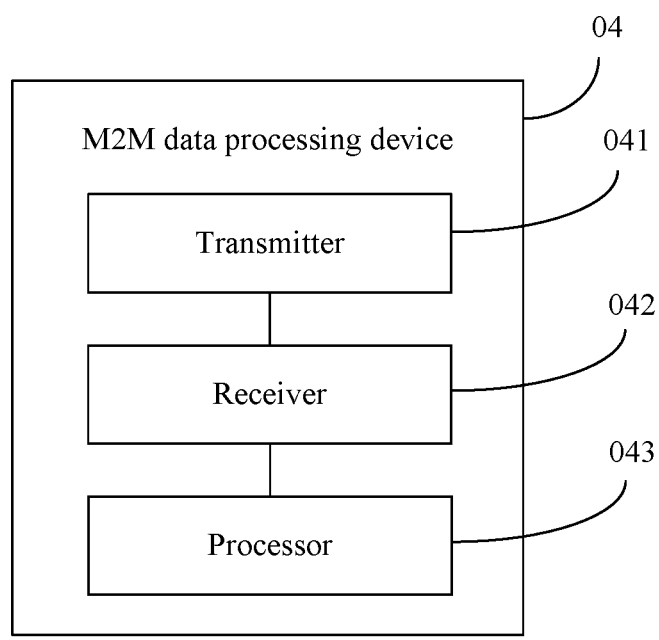
FIG. 20 is a schematic structural diagram of an M2M data processing device according to yet another example of an embodiment of the present invention.

Yet another example of an embodiment of the present invention provides an M2M data processing device 04 applied to an M2M device. As shown in FIG. 20, the M2M data processing device 04 includes: a transmitter 041, a receiver 042, and a processor 043.

The transmitter 041 is configured to send a registration request to an M2M service platform, so that the M2M service platform obtains a filled capability model according to a capability model and capability information of the M2M device after authentication on the registration request succeeds, and updates an overall capability model according to the filled capability model.

The capability model includes three types of capabilities: a communication capability, a control capability, and a measurement capability, and each capability is divided into multiple subentries according to a preset rule; the filled capability model describes at least one subentry corresponding to a communication capability, a control capability, and a measurement capability of the M2M device; and capability information of all registered M2M devices managed by the M2M service platform is recorded in the overall capability model in a type division manner of the capability model.

In conclusion, according to the M2M data processing method provided in this embodiment of the present invention, a capability model includes three types of capabilities: a communication capability, a control capability, and a measurement capability, and each capability is divided into multiple subentries according to a preset rule. Therefore, a filled capability model obtained according to the capability model and capability information of an M2M device is also divided in a type division manner of the capability model; and an overall capability model updated by using the filled capability model is also divided in the type division manner of the capability model. In this case, a query may be performed by the type without massive data queries. Therefore, a query latency and waste of hardware resources of an M2M service platform are reduced.

An embodiment of the present invention provides an M2M data processing device 04 applied to an M2M device. As shown in FIG. 18, the M2M data processing device 04 includes: a transmitter 041, a receiver 042, and a processor 043.

The transmitter 041 is configured to send a registration request to an M2M service platform, so that the M2M service platform obtains a filled capability model according to a capability model and capability information of the M2M device after authentication on the registration request succeeds, and updates an overall capability model according to the filled capability model.

The capability model includes three types of capabilities: a communication capability, a control capability, and a measurement capability, and each capability is divided into multiple subentries according to a preset rule; the filled capability model describes at least one subentry corresponding to a communication capability, a control capability, and a measurement capability of the M2M device; and capability information of all registered M2M devices managed by the M2M service platform is recorded in the overall capability model in a type division manner of the capability model.

The receiver 042 is configured to receive the capability model sent by the M2M service platform.

The processor 043 is configured to fill the capability model according to the capability information of the M2M device to obtain the filled capability model.

The transmitter 041 is further configured to send the filled capability model to the M2M service platform.

Optionally, the registration request includes a model filling capability identifier, and the model filling capability identifier is used to indicate whether the M2M device has a model filling capability.

Optionally, the registration request includes the capability information of the M2M device.

An embodiment of the present invention provides an M2M data processing device 04 applied to an M2M device. As shown in FIG. 18, the M2M data processing device 04 includes: a transmitter 041, a receiver 042, and a processor 043. An application program is installed on the M2M device.

The transmitter 041 is configured to send a registration request to an M2M service platform, so that the M2M service platform obtains a filled capability model according to a capability model and capability information of the M2M device after authentication on the registration request succeeds, and updates an overall capability model according to the filled capability model.

The capability model includes three types of capabilities: a communication capability, a control capability, and a measurement capability, and each capability is divided into multiple subentries according to a preset rule; the filled capability model describes at least one subentry corresponding to a communication capability, a control capability, and a measurement capability of the M2M device; and capability information of all registered M2M devices managed by the M2M service platform is recorded in the overall capability model in a type division manner of the capability model.

The transmitter 041 is further configured to send a query condition to the M2M service platform by using the application program, so that the M2M service platform searches the overall capability model according to the query condition, uses a device that meets the query condition as a to-be-queried device, and sends an identifier of the to-be-queried device to the application program.

A subentry of each capability in a communication capability, a control capability, and a measurement capability in the overall capability model includes a type subentry and at least one data subentry. The type subentry is used to describe a semantic meaning of each capability, and the at least one data subentry is used to describe a practical meaning of each capability. A capability field model is established on the M2M service platform, and the capability field model describes a capability category of each capability in the communication capability, the control capability, and the measurement capability. A described type subentry of a subentry of each capability in the overall capability model is associated with a capability category of a corresponding capability in the capability field model. The query condition includes a capability category of at least one capability in the communication capability, the control capability, and the measurement capability.

An embodiment of the present invention provides an M2M data processing device 04 applied to an M2M device. As shown in FIG. 18, the M2M data processing device 04 includes: a transmitter 041, a receiver 042, and a processor 043. An application program is installed on the M2M device.

The transmitter 041 is configured to send a registration request to an M2M service platform, so that the M2M service platform obtains a filled capability model according to a capability model and capability information of the M2M device after authentication on the registration request succeeds, and updates an overall capability model according to the filled capability model.

The capability model includes three types of capabilities: a communication capability, a control capability, and a measurement capability, and each capability is divided into multiple subentries according to a preset rule; the filled capability model describes at least one subentry corresponding to a communication capability, a control capability, and a measurement capability of the M2M device; and capability information of all registered M2M devices managed by the M2M service platform is recorded in the overall capability model in a type division manner of the capability model.

The transmitter 041 is further configured to send a query condition to the M2M service platform by using the application program, so that the M2M service platform searches the overall capability model according to the query condition, uses a device that meets the query condition as a to-be-queried device, and sends an identifier of the to-be-queried device to the application program.

The processor 043 is configured to select a target M2M device from the device corresponding to the identifier of the to-be-queried device.

The transmitter 041 is further configured to send control information to the M2M service platform, where the control information includes an identifier of the target M2M device and an instruction parameter, so that the M2M service platform queries the at least one data subentry in the control capability in the overall capability model according to the identifier of the target M2M device to obtain a control command corresponding to the target M2M device, generates a target control command according to the instruction parameter and the control command, and sends the target control command to the target M2M device according to the identifier of the target M2M device.

The receiver 042 is configured to receive feedback data sent by the M2M service platform, where after the target M2M device performs an action instructed by the target control command, the feedback data is generated and sent to the M2M service platform.

A type subentry of the communication capability in the overall capability model is a communication type subentry, and at least one data subentry of the communication capability in the overall capability model includes: a communication medium subentry, a communication range subentry, a communication manner subentry, and a communication protocol subentry.

A type subentry of the control capability in the overall capability model is a control type subentry, a data subentry of the control capability in the overall capability model describes control commands corresponding to all the registered M2M devices, and each control command includes next-level subentries such as a command description subentry, a device subentry, a URI subentry, and a parameter subentry.

In conclusion, according to the M2M data processing method provided in this embodiment of the present invention, a capability model includes three types of capabilities: a communication capability, a control capability, and a measurement capability, and each capability is divided into multiple subentries according to a preset rule. Therefore, a filled capability model obtained according to the capability model and capability information of an M2M device is also divided in a type division manner of the capability model; and an overall capability model updated by using the filled capability model is also divided in the type division manner of the capability model. In this case, a query may be performed by the type without massive data queries. Therefore, a query latency and waste of hardware resources of an M2M service platform are reduced.

An embodiment of the present invention provides an M2M data processing system. For a specific structure, reference may be made to FIG. 1, and the M2M data processing system includes: an M2M service platform and an M2M device.

The M2M service platform includes the M2M data processing device shown in FIG. 19 in the embodiments of the present invention.

The M2M device includes the M2M data processing device shown in FIG. 20 in the embodiments of the present invention.

It may be clearly understood by a person skilled in the art that, for the purpose of convenient and brief description, for a detailed working process of the foregoing system, device, and unit, reference may be made to a corresponding process in the foregoing method embodiments, and details are not described herein again.

In the several embodiments provided in this application, it should be understood that the disclosed system, device, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

What is claimed is:

1. A machine-to-machine, M2M, data processing method, wherein the method is applied to an M2M service platform, and comprises:
   receiving a registration request sent by an M2M device;
   obtaining a filled capability model according to a capability model and capability information of the M2M device after authentication on the registration request succeeds, wherein the capability model comprises three types of capabilities: a communication capability, a control capability, and a measurement capability, each capability is divided into multiple subentries according to a preset rule, and the filled capability model describes at least one subentry corresponding to a communication capability, a control capability, and a measurement capability of the M2M device; and
   updating an overall capability model according to the filled capability model, wherein capability information of all registered M2M devices managed by the M2M service platform is recorded in the overall capability model in a type division manner of the capability model.

2. The method according to claim 1, wherein the obtaining a filled capability model according to a capability model and capability information of the M2M device comprises:

sending the capability model to the M2M device, so that the M2M device fills the capability model according to the capability information of the M2M device to obtain the filled capability model; and receiving the filled capability model sent by the M2M device.

3. The method according to claim 2, wherein the registration request comprises a model filling capability identifier, and the model filling capability identifier is used to indicate whether the M2M device has a model filling capability; and the sending the capability model to the M2M device comprises:

determining, according to the model filling capability identifier, whether the M2M device has the model filling capability; and sending the capability model to the M2M device if the M2M device has the model filling capability.

4. The method according to claim 1, wherein the registration request comprises the capability information of the M2M device; and the obtaining a filled capability model according to a capability model and capability information of the M2M device comprises:

filling, by the M2M service platform, the capability model with the capability information of the M2M device to obtain the filled capability model.

5. The method according to claim 1, wherein after the updating an overall capability model according to the filled capability model, the method further comprises:

receiving a query condition sent by an application program, wherein the application program is installed on the M2M device;

searching the overall capability model according to the query condition, and using a device that meets the query condition as a to-be-queried device; and sending an identifier of the to-be-queried device to the application program of the M2M device.

6. The method according to claim 5, wherein a subentry of each capability in a communication capability, a control capability, and a measurement capability in the overall capability model comprises a type subentry and at least one data subentry; the type subentry is used to describe a semantic meaning of each capability, and the at least one data subentry is used to describe a practical meaning of each capability; a capability field model is established on the M2M service platform, and the capability field model describes a capability category of each capability in the communication capability, the control capability, and the measurement capability; a described type subentry of a subentry of each capability in the overall capability model is associated with a capability category of a corresponding capability in the capability field model; the query condition comprises a capability category of at least one capability in the communication capability, the control capability, and the measurement capability; and the searching the overall capability model according to the query condition, and using a device that meets the query condition as a to-be-queried device comprises:

querying, according to the query condition, a capability category that is in the capability field model and indicated by the query condition;

searching, according to the capability category indicated by the query condition, the overall capability model for a type subentry that is associated with the capability category indicated by the query condition, and using the type subentry as a to-be-queried type subentry; and searching the overall capability model according to the to-be-queried type subentry, and using, as the to-be-queried device, a device on which the to-be-queried type subentry is described.

7. The method according to claim 6, wherein a data subentry in the control capability in the overall capability model describes control commands corresponding to all the registered M2M devices, and after the sending an identifier of the to-be-queried device to the application program, the method further comprises:

receiving control information sent by the application program, wherein the control information comprises an identifier of the target M2M device and an instruction parameter, and the target M2M device is selected by the application program from the device corresponding to the identifier of the to-be-queried device;

querying the at least one data subentry in the control capability in the overall capability model according to the identifier of the target M2M device to obtain a control command corresponding to the target M2M device;

generating a target control command according to the instruction parameter and the control command;

sending the target control command to the target M2M device according to the identifier of the target M2M device, so that the target M2M device performs an action instructed by the target control command and generates feedback data;

receiving the feedback data sent by the target M2M device; and sending the feedback data to the application program.

8. The method according to claim 6, wherein a type subentry of the communication capability in the overall capability model is a communication type subentry, and at least one data subentry of the communication capability in the overall capability model comprises: a communication medium subentry, a communication range subentry, a communication manner subentry, and a communication protocol subentry; and a type subentry of the control capability in the overall capability model is a control type subentry, a data subentry of the control capability in the overall capability model describes control commands corresponding to all the registered M2M devices, and each control command comprises next-level subentries such as a command description subentry, a method subentry, a uniform resource identifier URI subentry, and a parameter subentry.

9. An M2M data processing method, wherein the method is applied to an M2M device, and comprises:

sending a registration request to an M2M service platform, so that the M2M service platform obtains a filled capability model according to a capability model and capability information of the M2M device after authentication on the registration request succeeds, and updates an overall capability model according to the filled capability model, wherein the capability model comprises three types of capabilities: a communication capability, a control capability, and a measurement capability, and each capability is divided into multiple subentries according to a preset rule; the filled capability model describes at least one subentry corresponding to a communication capability, a control capability, and a measurement capability of the M2M device; and capability information of all registered M2M devices managed by the M2M service platform is recorded in the overall capability model in a type division manner of the capability model.

10. The method according to claim 9, wherein after the sending a registration request to an M2M service platform, the method further comprises:
receiving the capability model sent by the M2M service platform;
filling the capability model according to the capability information of the M2M device to obtain the filled capability model; and
sending the filled capability model to the M2M service platform.

11. The method according to claim 10, wherein the registration request comprises a model filling capability identifier, and the model filling capability identifier is used to indicate whether the M2M device has a model filling capability.

12. The method according to claim 9, wherein the registration request comprises the capability information of the M2M device.

13. The method according to claim 9, wherein an application program is installed on the M2M device; and
after the sending a registration request to an M2M service platform, the method further comprises:
sending a query condition to the M2M service platform by using the application program, so that the M2M service platform searches the overall capability model according to the query condition, uses a device that meets the query condition as a to-be-queried device, and sends an identifier of the to-be-queried device to the application program.

14. The method according to claim 13, wherein a subentry of each capability in a communication capability, a control capability, and a measurement capability in the overall capability model comprises a type subentry and at least one data subentry; the type subentry is used to describe a semantic meaning of each capability, and the at least one data subentry is used to describe a practical meaning of each capability; a capability field model is established on the M2M service platform, and the capability field model describes a capability category of each capability in the communication capability, the control capability, and the measurement capability; a described type subentry of a subentry of each capability in the overall capability model is associated with a capability category of a corresponding capability in the capability field model; and the query condition comprises a capability category of at least one capability in the communication capability, the control capability, and the measurement capability.

15. The method according to claim 14, wherein a data subentry in the control capability in the overall capability model describes control commands corresponding to all the registered M2M devices, and after the identifier that is of the to-be-queried device and sent by the M2M service platform is received, the method further comprises:
selecting a target M2M device from the device corresponding to the identifier of the to-be-queried device;
sending control information to the M2M service platform, wherein the control information comprises an identifier of the target M2M device and an instruction parameter, so that the M2M service platform queries the at least one data subentry in the control capability in the overall capability model according to the identifier of the target M2M device to obtain a control command corresponding to the target M2M device, generates a target control command according to the instruction parameter and the control command, and sends the target control command to the target M2M device according to the identifier of the target M2M device; and
receiving feedback data sent by the M2M service platform, wherein after the target M2M device performs an action instructed by the target control command, the feedback data is generated and sent to the M2M service platform.

16. The method according to claim 14, wherein
a type subentry of the communication capability in the overall capability model is a communication type subentry, and at least one data subentry of the communication capability in the overall capability model comprises: a communication medium subentry, a communication range subentry, a communication manner subentry, and a communication protocol subentry; and
a type subentry of the control capability in the overall capability model is a control type subentry, a data subentry of the control capability in the overall capability model describes control commands corresponding to all the registered M2M devices, and each control command comprises next-level subentries such as a command description subentry, a method subentry, a URI subentry, and a parameter subentry.

17. An M2M data processing device, wherein the device is applied to an M2M service platform, and comprises:
a first receiving unit, configured to receive a registration request sent by an M2M device;
an obtaining unit, configured to obtain a filled capability model according to a capability model and capability information of the M2M device after authentication on the registration request succeeds, wherein the capability model comprises three types of capabilities: a communication capability, a control capability, and a measurement capability, each capability is divided into multiple subentries according to a preset rule, and the filled capability model describes at least one subentry corresponding to a communication capability, a control capability, and a measurement capability of the M2M device; and
an update unit, configured to update an overall capability model according to the filled capability model, wherein capability information of all registered M2M devices managed by the M2M service platform is recorded in the overall capability model in a type division manner of the capability model.

18. The device according to claim 17, wherein the obtaining unit comprises:
a sending subunit, configured to send the capability model to the M2M device, so that the M2M device fills the capability model according to the capability information of the M2M device to obtain the filled capability model; and
a receiving subunit, configured to receive the filled capability model sent by the M2M device.

19. The device according to claim 18, wherein the registration request comprises a model filling capability identifier, and the model filling capability identifier is used to indicate whether the M2M device has a model filling capability; and
the sending subunit is specifically configured to:
determine, according to the model filling capability identifier, whether the M2M device has the model filling capability; and send the capability model to the M2M device if the M2M device has the model filling capability.

20. The device according to claim 17, wherein the registration request comprises the capability information of the M2M device; and
the obtaining unit comprises:
a filling subunit, configured to fill the capability model with the capability information of the M2M device to obtain the filled capability model.

21. The device according to claim 17, wherein the device further comprises:
a second receiving unit, configured to receive a query condition sent by an application program, wherein the application program is installed on the M2M device;
a first querying unit, configured to search the overall capability model according to the query condition, and use a device that meets the query condition as a to-be-queried device; and
a first sending unit, configured to send an identifier of the to-be-queried device to the application program of the M2M device.

22. The device according to claim 21, wherein a subentry of each capability in a communication capability, a control capability, and a measurement capability in the overall capability model comprises a type subentry and at least one data subentry; the type subentry is used to describe a semantic meaning of each capability, and the at least one data subentry is used to describe a practical meaning of each capability; a capability field model is established on the M2M service platform, and the capability field model describes a capability category of each capability in the communication capability, the control capability, and the measurement capability; a described type subentry of a subentry of each capability in the overall capability model is associated with a capability category of a corresponding capability in the capability field model; the query condition comprises a capability category of at least one capability in the communication capability, the control capability, and the measurement capability; and
the first querying unit comprises:
a querying subunit, configured to query, according to the query condition, a capability category that is in the capability field model and indicated by the query condition;
a searching subunit, configured to search, according to the capability category indicated by the query condition, the overall capability model for a type subentry that is associated with the capability category indicated by the query condition, and use the type subentry as a to-be-queried type subentry; and
a determining subunit, configured to search the overall capability model according to the to-be-queried type subentry, and use, as the to-be-queried device, a device on which the to-be-queried type subentry is described.

23. The device according to claim 22, wherein a data subentry in the control capability in the overall capability model describes control commands corresponding to all the registered M2M devices, and the device further comprises:
a third receiving unit, configured to receive control information sent by the application program, wherein the control information comprises an identifier of the target M2M device and an instruction parameter, and the target M2M device is selected by the application program from the device corresponding to the identifier of the to-be-queried device;
a second querying unit, configured to query at least one data subentry in the control capability in the overall capability model according to the identifier of the target M2M device to obtain a control command corresponding to the target M2M device;
a generation unit, configured to generate a target control command according to the instruction parameter and the control command;
a second sending unit, configured to send the target control command to the target M2M device according to the identifier of the target M2M device, so that the target M2M device performs an action instructed by the target control command and generates feedback data;
a fourth receiving unit, configured to receive the feedback data sent by the target M2M device; and
a third sending unit, configured to send the feedback data to the application program.

24. The device according to claim 22, wherein
a type subentry of the communication capability in the overall capability model is a communication type subentry, and at least one data subentry of the communication capability in the overall capability model comprises: a communication medium subentry, a communication range subentry, a communication manner subentry, and a communication protocol subentry; and
a type subentry of the control capability in the overall capability model is a control type subentry, a data subentry of the control capability in the overall capability model describes control commands corresponding to all the registered M2M devices, and each control command comprises next-level subentries such as a command description subentry, a device subentry, a URI subentry, and a parameter subentry.

25. An M2M data processing device, wherein the device is applied to an M2M device, and comprises:
a first sending unit, configured to send a registration request to an M2M service platform, so that the M2M service platform obtains a filled capability model according to a capability model and capability information of the M2M device after authentication on the registration request succeeds, and updates an overall capability model according to the filled capability model, wherein
the capability model comprises three types of capabilities: a communication capability, a control capability, and a measurement capability, and each capability is divided into multiple subentries according to a preset rule; the filled capability model describes at least one subentry corresponding to a communication capability, a control capability, and a measurement capability of the M2M device; and capability information of all registered M2M devices managed by the M2M service platform is recorded in the overall capability model in a type division manner of the capability model.

26. The device according to claim 25, wherein the device further comprises:
a first receiving unit, configured to receive the capability model sent by the M2M service platform;
a filling unit, configured to fill the capability model according to the capability information of the M2M device to obtain the filled capability model; and
a second sending unit, configured to send the filled capability model to the M2M service platform.

27. The device according to claim 26, wherein the registration request comprises a model filling capability identifier, and the model filling capability identifier is used to indicate whether the M2M device has a model filling capability.

28. The device according to claim 25, wherein the registration request comprises the capability information of the M2M device.

29. The device according to claim 25, wherein an application program is installed on the M2M device; and the device further comprises:
  a third sending unit, configured to send a query condition to the M2M service platform by using the application program, so that the M2M service platform searches the overall capability model according to the query condition, uses a device that meets the query condition as a to-be-queried device, and sends an identifier of the to-be-queried device to the application program.

30. The device according to claim 29, wherein a subentry of each capability in a communication capability, a control capability, and a measurement capability in the overall capability model comprises a type subentry and at least one data subentry; the type subentry is used to describe a semantic meaning of each capability, and the at least one data subentry is used to describe a practical meaning of each capability; a capability field model is established on the M2M service platform, and the capability field model describes a capability category of each capability in the communication capability, the control capability, and the measurement capability; a described type subentry of a subentry of each capability in the overall capability model is associated with a capability category of a corresponding capability in the capability field model; and the query condition comprises a capability category of at least one capability in the communication capability, the control capability, and the measurement capability.

31. The device according to claim 30, wherein a data subentry in the control capability in the overall capability model describes control commands corresponding to all the registered M2M devices, and the device further comprises:
  a selection unit, configured to select a target M2M device from the device corresponding to the identifier of the to-be-queried device;
  a fourth sending unit, configured to send control information to the M2M service platform, wherein the control information comprises an identifier of the target M2M device and an instruction parameter, so that the M2M service platform queries the at least one data subentry in the control capability in the overall capability model according to the identifier of the target M2M device to obtain a control command corresponding to the target M2M device, generates a target control command according to the instruction parameter and the control command, and sends the target control command to the target M2M device according to the identifier of the target M2M device; and
  a second receiving unit, configured to receive feedback data sent by the M2M service platform, wherein after the target M2M device performs an action instructed by the target control command, the feedback data is generated and sent to the M2M service platform.

32. The device according to claim 30, wherein
a type subentry of the communication capability in the overall capability model is a communication type subentry, and at least one data subentry of the communication capability in the overall capability model comprises: a communication medium subentry, a communication range subentry, a communication manner subentry, and a communication protocol subentry; and
a type subentry of the control capability in the overall capability model is a control type subentry, a data subentry of the control capability in the overall capability model describes control commands corresponding to all the registered M2M devices, and each control command comprises next-level subentries such as a command description subentry, a device subentry, a URI subentry, and a parameter subentry.

* * * * *